United States Patent
Oba et al.

(10) Patent No.: US 7,202,773 B1
(45) Date of Patent: Apr. 10, 2007

(54) AUTHENTICATION INFORMATION COMMUNICATION SYSTEM AND METHOD, PORTABLE INFORMATION PROCESSING DEVICE AND PROGRAM FURNISHING MEDIUM

(75) Inventors: Haruo Oba, Kanagawa (JP); Keiichi Totsuka, Tokyo (JP); Junichi Rekimoto, Tokyo (JP); Nubuyuki Matsushita, Kanagawa (JP); Chisato Numaoka, Kanagawa (JP)

(73) Assignee: Sony Corporation, Tokyo (JP)

( * ) Notice: Subject to any disclaimer, the term of this patent is extended or adjusted under 35 U.S.C. 154(b) by 502 days.

(21) Appl. No.: 09/696,927

(22) Filed: Oct. 26, 2000

(30) Foreign Application Priority Data

Nov. 1, 1999 (JP) ............................. P11-310517
Aug. 24, 2000 (JP) ........................... P2000-253305

(51) Int. Cl.
G05B 19/00 (2006.01)
H04L 9/00 (2006.01)

(52) U.S. Cl. ..................................... 340/5.8; 713/168
(58) Field of Classification Search ................ 713/168, 713/193; 340/5.8
See application file for complete search history.

(56) References Cited

U.S. PATENT DOCUMENTS

| | | | | |
|---|---|---|---|---|
| 5,136,644 A | * | 8/1992 | Audebert et al. | 380/251 |
| 5,402,490 A | * | 3/1995 | Mihm, Jr. | 380/247 |
| 5,572,193 A | * | 11/1996 | Flanders et al. | 340/5.74 |
| 5,625,695 A | * | 4/1997 | M'Raihi et al. | 380/28 |
| 5,629,981 A | * | 5/1997 | Nerlikar | 713/168 |
| 5,696,825 A | * | 12/1997 | Johnson et al. | 713/193 |
| 5,748,737 A | * | 5/1998 | Daggar | 705/41 |
| 5,796,827 A | * | 8/1998 | Coppersmith et al. | 713/182 |
| 5,907,522 A | * | 5/1999 | Teodoridis et al. | 368/10 |
| 5,914,701 A | | 6/1999 | Gersheneld et al. | |
| 5,953,425 A | * | 9/1999 | Selker | 713/185 |
| 6,003,135 A | * | 12/1999 | Bialick et al. | 713/201 |
| 6,020,891 A | | 2/2000 | Rekimoto | |
| 6,055,536 A | | 4/2000 | Shimakawa et al. | |
| 6,393,567 B1 | * | 5/2002 | Colnot | 713/182 |
| 6,580,356 B1 | * | 6/2003 | Alt et al. | 340/5.8 |

FOREIGN PATENT DOCUMENTS

| | | |
|---|---|---|
| JP | 7170215 | 7/1995 |
| JP | 11161763 | 6/1999 |

* cited by examiner

*Primary Examiner*—Nasser Moazzami
*Assistant Examiner*—Pramila Parthasarathy
(74) *Attorney, Agent, or Firm*—Bell, Boyd & Lloyd LLP

(57) ABSTRACT

A system for executing personal authentication processing by communication through a human body, in which authentication corresponding to a service to be furnished can be executed efficiently. The authentication processing between a portable equipment worn by a user and a service furnishing terminal is executed by a human body touching a contact point of the service furnishing terminal. The processing occurs with a real physical feeling of user contact. A user-native identifier and a user-variable identifier generated from user to user depending on the service presented by a service terminal are stored in a user equipment. Responsive to the service identifier transmitted from the service terminal, service-native user identification data, derived at least from the user variable identifier, is generated in the portable equipment and forwarded to the service terminal. A variety of user management operations, such as user-based assessment operations, depending on service contents, are carried out.

19 Claims, 16 Drawing Sheets

| FIXED USER ID | REGISTERED USER DATA | MAX. NUMBER OF TIMES OF USE | CURRENT NUMBER OF TIMES OF USE |
|---|---|---|---|
|  |  |  |  |
| 10100000 | 1010000000010011 | 100 | 35 |
|  |  |  |  |

FIG.14

AUTHENTICATION INFORMATION COMMUNICATION SYSTEM AND METHOD, PORTABLE INFORMATION PROCESSING DEVICE AND PROGRAM FURNISHING MEDIUM

BACKGROUND OF THE INVENTION

1. Field of the Invention

This invention relates to an authentication information communication system and method, portable information processing device and a program furnishing medium. More particularly, it relates to a personal authentication information communication system and a personal authentication information communication method which enables data communication with a portable equipment having a contact as an electrode carried by a human body by a portion of a human body, e.g., a hand, contacting another contact, similarly as an electrode, provided on an external equipment to transmit data necessary for personal authentication through the human body to enable personal authentication processing and information exchange with an external equipment. The portable equipment, to which the present invention is applied, is realized by a small-sized article usually worn by a user and which has a curved fitting portion, such as a timepiece or a ring, such that data for personal authentication is stored in this type of the personal accessories.

2. Description of Related Art

There has hitherto been known a system in which personal authentication is performed using a non-contact card to control an external equipment based on the result of authentication (see, for example, Japanese Laying-Open Patent H-11-161763). The non-contact card is one of the configurations felt to be promising as an effective technique as a system which possibly takes the place of a commutation ticket or a pre-paid card.

However, a user of this non-contact card to be authenticated by this card has to take the card itself by hand and to approach it to an information reader, such as a sensor, in order to get the read-out processing executed. Each of these processing operations is time-consuming. For example, if a series of operations has to be executed one-by-one within limited time, as when the user passes through an entrance gate or a wicket gate, the card reading for personal authentication, authentication processing based on the read-out data and gate opening/closing operations based on the results of the authentication processing need to be performed in succession for plural users. If the processing time per user is increased, the processing time for many users is correspondingly increased to render the realization difficult. In this meaning, the non-contact card cannot be the to be superior in all aspects to the conventional contact type card.

Moreover, a user exploiting the non-contact card or a portable equipment for authentication other than the card type is required to execute an extremely ambiguous processing operation such as causing the authentication equipment, such as a card, worn or taken out by the user, to approach to or to pass by the authentication equipment or the processing device, without the processing of directly contacting the authentication equipment with the authentication or processing device. So, the user cannot feel that data readout has succeeded or the personal authentication processing is being carried out, such that the user cannot discern e.g., the processing start timing. Since the user cannot check as to whether or not the processing is being carried out, there may be produced an error such as a gate not being opened after a pre-set time, while there is not obtained the result of failure in readout processing or in authentication until such error is actually produced.

In view of the above depicted status of the prior art, the present invention provides a system and a method for personal authentication information communication in which personal authentication is executed in the same way as in the conventional contact card or in the non-contact card. A user desirous to undergo personal authentication contacts a portion of his or her body, such as a finger or a palm, with a contact provided in an equipment constituting the authentication system to transfer data for personal authentication through the body of the user. Thus, the start of the processing for personal authentication can be recognized by no other than the user to improve the ease with which the personal authentication processing system is used. Moreover, the user may feel physically that the authentication processing and the variety of processing operations have actually been initiated based on the authentication processing.

As prior-art techniques showing the above-described system of transmitting data through a human body, there are, for example, the following techniques:

In the Japanese Laying-Open Patent H-7-170215 and U.S. Pat. No. 5,914,701, there is disclosed such a configuration in which, in two separate systems, each having an electrode, electric waves which, unless modified, are not sufficient in intensity to permit communication, are transmitted between the systems, so that data transfer between the systems occurs with a human body interposed therebetween as a medium for transmission. For example, the Japanese Laying-Open Patent H-7-170215 shows a configuration in which audio/video signals are transmitted through an electrically conductive member and the human body so as to be output to a reception terminal provided with a display and a loudspeaker.

In the U.S. Pat. No. 5,796,827, there is disclosed a concept in a system for data transmission through human body in which means are additionally provided for transmitting/receiving encrypted data for application of the system to e.g., a credit card or a cash card. Specifically, this configuration is such a one in which encoded data is transmitted from a transmitter to a receiver through a human body as a medium for transmission and in which an authentication processing device connected to the receiver processes and authenticates the encoded data transmitted through the human body. The US patent shows a configuration in which an electrode for realizing data transmission through the human body can be built into an article routinely worn by the user, such as a wrist-watch, apparel or shoe. By having the electrode fitted on an article routinely worn by the user, that is items of personal accessories, it is unnecessary to have a dedicated electrode constituting item worn by the user.

However, service types have recently been diversified, such that, in many cases, the processing types executed after authentication processing are desirably made to differ depending on the place and the time or from user to user. If the user is identified by authentication processing to unanimously execute the processing depending on the result of the authentication, the contents of the services offered are undesirably fixed and invariable. If, when users A and B, desirous to acquire the BGM at a service furnishing terminal executing the information purveying services, are fans of classic music and rock music, respectively, and the music information is distributed based merely on the authentication processing, the music information distributed may not be in meeting with the liking of the user. Alternatively, if the service furnishing terminal is such a one adapted for controlling the opening/closing of an entrance gate of a recreation park, it is desirable to set the proper time and place for gate opening/closure from one user to another.

It is of course possible to provide a table adapted for setting the services presented from user to user and to determine the service to be furnished based on the user ID to execute the so-determined services, the data processing, that is data transmission from the information furnishing terminal to the CPU. However, such data processing, that is data transfer in the data processing device, decision of the processing mode or data transfer from the information furnishing terminal to the CPU, data processing in the data processing device, decision of the processing mode or data transmission to the information furnishing device, is time-consuming, such that the delay caused in the processing is accumulated in an environment in which processing for different users has to be carried out in succession.

SUMMARY OF THE INVENTION

It is therefore an object of the present invention to provide such a configuration in which, for enabling instantaneous execution of the processing operations under modes different from user to user or from service to service, authentication data independent from service to service and unique from user to user are prepared and stored in a portable equipment of a user to enable authentication data to be output on service request.

It is another object of the present invention to provide such a configuration in which, for imparting to the user the feeling of having achieved the processing by the user touching a contact point of a service furnishing terminal without detracting from the convenience in use proper to a non-contact card, a portable information processing device designed for communication through a human body has a curved contact point in such a manner as to permit the contact point to be loaded on the human body in a state contacting the human body.

In its first aspect, the present invention provides an authentication information communication system made up of a portable information processing device executing the communication through a human body, and a service furnishing device, wherein the portable information processing device includes a contact point A contacting the human body to establish a communication path through the human body, fixed data storage means for memorizing fixed user identification data capable of identifying a user, variable data storage means for holding variable user identification data corresponding to a service furnished by the service furnishing device, and outputting means for outputting at least authentication data which is based on the variable user identification data. The service furnishing device includes a contact point B contacting the human body to establish a communication path through the human body, and control means for controlling service execution based on the results of the authentication processing which is based on the authentication data. In the authentication information communication system, the portable information processing device preferably includes synthesizing means for synthesizing fixed user identification data stored in the fixed data storage means and variable user identification data stored in the variable data storage means the synthesizing means generates authentication data which is based on the fixed user identification data and the variable user identification data.

In the authentication information communication system, the service furnishing device includes authentication means for executing authentication processing which is based on the authentication data transferred from the portable information processing device through the contact points A and B. The control means controls service execution based on the results of authentication processing by the authentication means.

In the authentication information communication system, the service furnishing device preferably includes service identifier holding means for holding a service identifier corresponding to a service to be furnished. The portable information processing device is configured for storing the variable user identification data in the variable data storage means in association with the service identifier, wherein corresponding variable user identification data is extracted from the variable data storage means based on the service identifier received from the service furnishing device through the contact points A and B to output the authentication data which is based on the extracted variable user identification data.

In the authentication information communication system, the service furnishing device preferably includes means for generating user identification data for authentication corresponding to a service to be furnished. The portable information processing device is configured for receiving user identification data for authentication generated by the means adapted for generating user identification data for authentication from the service furnishing device through the contact points A and B for storage as variable user identification data in the variable user identification data storage means.

In the authentication information communication system, the authentication information communication system preferably further includes user management means for executing authentication processing for a user. The user management means includes a registration table having registered therein the user registration state and the service use state from one registered user to another. the user management means is configured for executing the authentication processing based on the registration table.

Preferably, the authentication information communication system further includes service registration means for registering a service furnished to the user. The service registration means includes means for generating user identification data for authentication corresponding to a service to be furnished by the service furnishing device. The portable information processing device is configured for storing the user identification data for authentication generated by the service registration means in the variable user identification data storage means as variable user identification data.

In the authentication information communication system, the variable user identification data preferably includes the information for setting the service mode of a service furnished by the service furnishing device.

In its second aspect, the present invention provides a portable information processing device for executing communication with a service furnishing device through a human body. The portable information processing device includes a contact point A contacting the human body to establish a communication path through the human body, fixed data storage means for memorizing fixed user identification data capable of identifying a user, variable data storage means for holding variable user identification data corresponding to a service furnished by the service furnishing device and outputting means for outputting at least authentication data which is based on the variable user identification data.

Preferably, the portable information processing device includes synthesizing means for synthesizing fixed user identification data stored in the fixed data storage means and variable user identification data stored in the variable data storage means. The synthesizing means generates authentication data which is based on the fixed user identification data and the variable user identification data.

In the portable information processing device, the variable user identification data preferably is stored in the variable data storage means in association with a service identifier in the portable information processing device, wherein corresponding variable user identification data is extracted from the variable data storage means, based on the service identifier received from the service furnishing device to output the data for authentication which is based on the extracted variable user identification data.

In the portable information processing device, the variable user identification data preferably includes the mode setting information for the service furnished by the service furnishing device.

In the portable information processing device, preferably the contact point A is curved in profile to follow the mounting side of the human body.

Preferably, the portable information processing device is adapted for being mounted on one of a finger, an arm, a neck, a leg, a foot or a head of the user.

Preferably, the portable information processing device is enclosed in any of a wrist-watch, a necklace, a ring, a hair band or a bracelet.

In the portable information processing device, preferably the fixed data storage means and the variable data storage means are removable with respect to the portable information processing device.

In its third aspect, the present invention provides a method for authentication information communication executed by a portable information processing device including a contact point A adapted for establishing a communication path through a human body on having contact therewith and a service furnishing device including a contact point B adapted for establishing a communication path through a human body on having contact therewith, in which the method includes a step of transmitting service identification data from the service furnishing device to the portable information processing device through the contacts B and A, a step of extracting variable user identification data corresponding to the service identification data from the variable user identification data storage means in the portable information processing device, a step of generating data for authentication based on the variable user identification data as extracted, a step of outputting the data for authentication from the portable information processing device to the service furnishing device through the contact points A and B, and a step of controlling service execution in the service furnishing device based on the results of authentication processing for the data for authentication.

In the method for authentication information communication. the step of generating the data for authentication preferably includes a step of synthesizing the variable user identification data and the fixed user identification data.

In the method for authentication information communication, preferably the service furnishing device executes the step of authentication processing executing the authentication processing based on the data for authentication transmitted from the portable information processing device through the contact points A and B. The control step controls the service execution based on the result of authentication processing of the authentication processing step.

In the method for authentication information, the service furnishing device preferably includes a step of generating user identification data for authentication corresponding to a service to be furnished. The portable information processing device receives user identification data for authentication generated in the step of generating the user identification data for authentication, from the service furnishing device through the contacts B and A, and stores the so-received data in the variable user identification data storage means as variable user identification data.

The method for authentication information communication preferably further includes a user management step of executing authentication processing for a user. The user management step includes a step of generating a registration table having registered therein the user registration state and the service using state from one registered user to another. The authentication processing is carried out based on the registration table.

The method for authentication information communication preferably further includes a step of registering a service to be furnished to a user. The service registration step includes a step of generating user identification data for authentication corresponding to a service furnished by the service furnishing device. The portable information processing device has a step of storing the user identification data for authentication generated in the service registration step in the variable user identification data storage means as variable user identification data.

In its fourth aspect, the present invention provides, in a system for authentication information communication executed by a portable information processing device having a contact point A adapted for establishing a communication path through a human body on having contact therewith and a service furnishing device having a contact point B adapted for establishing a communication path through a human body on having contact therewith, a program furnishing medium for tangibly furnishing a computer program which causes a processing executed on a service furnishing device to be executed on a computer system, in which the computer program includes a step of outputting service identification data from the service furnishing device through the contact point B to the portable information processing device, a step of receiving data for authentication generated by the portable information processing device based on the variable user identification data corresponding to the service identification data through the contact point B, and a step of controlling the service execution based on the result of authentication processing for the data for authentication.

In its fifth aspect, the present invention provides, in a system for authentication information communication executed by a portable information processing device having a contact point A adapted for establishing a communication path through a human body on having contact therewith and a service furnishing device having a contact point B adapted for establishing a communication path through a human body on having contact therewith, a program furnishing medium for tangibly furnishing a computer program which causes a processing executed on a service furnishing device to be executed on a computer system, in which the computer program includes a step of receiving service identification data output from the service furnishing device to the portable information processing device through the contact point A, a step of extracting variable user identification data corresponding to the service identification data from the variable user identification data storage means, a step of generating data for authentication based on the variable user identification data as extracted, and a step of outputting the data for authentication from the portable information processing device to the service furnishing device through the contact point A.

The program furnishing medium, according to the fourth and fifth aspects of the present invention, is a medium for furnishing a computer program to a general-purpose computer system, capable of executing a variety of program codes, in a computer-readable form. The medium may be a recording medium, such as a CD, FD or MO, or a transmission medium, such as a network, without limitations as to its realization.

This program furnishing medium defines the structural or functional relation of cooperation between the computer program and the furnishing medium for realizing a pre-set computer program on a computer system. Stated differently, there is achieved a cooperation on the computer system on installing the computer program through the furnishing medium on the computer system to realize the operation and favorable effects similar to those realized in the other aspects of the invention.

In the authentication information communication system and the authentication information communication method according to the present invention, in which the authentication processing between the portable equipment worn by the user and the service furnishing terminal furnishing a service is carried out by communication through a human body, and data communication is realized by the human body contacting respective contacts, the authentication processing occurs with the real physical feeling on the part of the user that the or she has actually made physical contact to resolve the ambiguity felt in the processing start recognition in a non-contact authentication system to relieve the user of uneasiness. Moreover, the laborious operation of taking out a card as in a conventional contact type authentication system employing a card or of readout by a sensor to assure a facilitated user operation.

Moreover, in the authentication information communication system and the authentication information communication method according to the present invention, in which the user-native identifier, proper to a user, and a user-variable identifier, generated from user to user depending on the service presented by the service terminal, are stored, and a service-native user identification data for authentication is generated at the portable terminal from the user-native identifier and the user-variable identifier and forwarded to the service terminal, a variety of user management and service management operations, such as user-based assessment operations may be executed depending on the contents prescribed by the service identifier In addition, in the authentication information communication system and the authentication information communication method according to the present invention, in which the service terminal sets a variable user ID matched to the service for the user, a variety of information items, such as information of the individual user, the information of the furnished service or limitations may be included in the variable user ID such that the service execution or the service mode can be modified based on the variable user ID received from the portable equipment.

Other objects, features and advantages of the present invention will become more apparent from the following detailed description of the present invention and the claims.

BRIEF DESCRIPTION OF THE DRAWINGS

FIG. 14 illustrates a typical registration table of an assessing authentication data storage unit of the second embodiment in the authentication information communication system according to the present invention.

DESCRIPTION OF THE PREFERRED EMBODIMENTS

Figure 1:
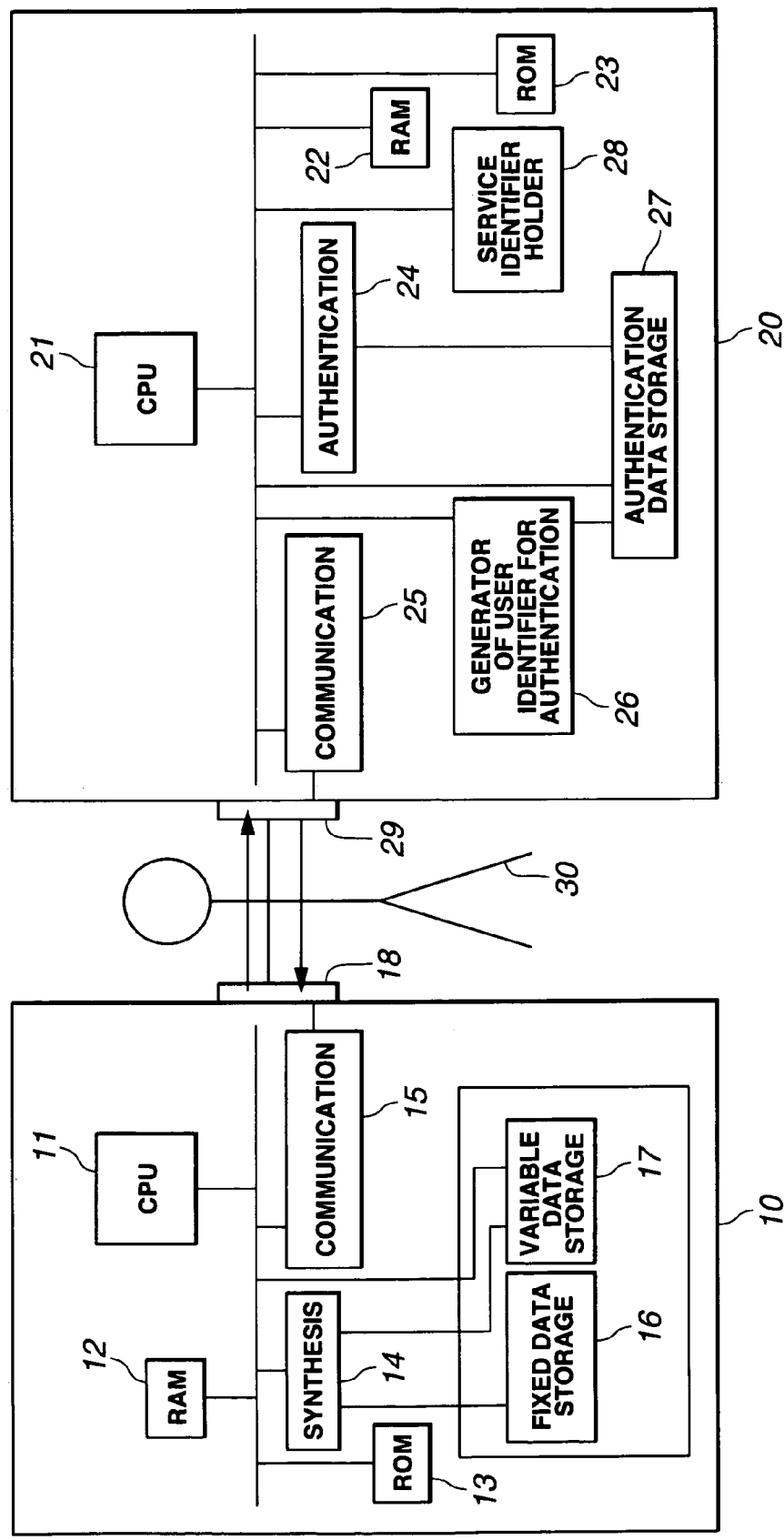
FIG. 1 is a block diagram showing a basic structure of an authentication information communication system according to the present invention.

Referring to the drawings, preferred embodiments of the present invention will be explained in detail.

FIG. 1 shows the basic structure of an entire transmission/reception apparatus constituting a first embodiment of the authentication information communication system according to the present invention.

Referring to FIG. 1, the authentication information communication system according to the present invention has a portable equipment 10 and a service terminal 20 as basic components and executes data transmission between the portable equipment 10 and the service terminal 20 through a human body. The portable equipment 10 is realized as an equipment that can be held or worn by a user 30 and may, for example, be in the form of items of personal accessories, such as a wrist watch, a necklace, a bracelet or a ring, or a component, such as a card. A contact point 18 is provided in extremely close proximity to the user 30 so as to contact or be in electrically conductive state with the user 30.

The service terminal 20 is a terminal for purveying a variety of information, such as music, picture, map or the like information or selling commercial goods, installed on a street or in a store, an ATM terminal, provided in a bank, a wicket gate in a station, as means of traffic, seats in public means of conveyance, such as aircraft or electrical car, or a device embedded in a wall of a building for furnishing a wide variety of services. The communication may be had between the portable equipment 10 and the service terminal 20 by the user 30 contacting a contact point 29 of the service terminal 20, such as by touching with a finger or the palm of his or her hand.

The data transmission between the portable equipment 10 and the service terminal 20 through the human body occurs by the human body, that is a portion of the user 30, contacting a contact point 18 provided on the portable equipment 10 and the contact point 29 provided on the service terminal 20. Meanwhile, since the portable equipment 10 is an item of personal accessories, such as a wrist watch, the contact point 18 is normally in perpetual contact with or in extremely close proximity to the human body in a state of electrical conduction therewith. So, data transfer between the portable equipment 10 and the service terminal 20 through the human body becomes feasible at a time point the user 30 touches the contact point 29 of the service terminal 20.

The data transfer between the portable equipment 10 and the service terminal 20 is executed between a communication unit 15 of the portable equipment 10 and a communication unit 25 of the service terminal 20. For this communication through the human body, the configuration shown in Japanese Laying-Open Patent H-7-170215 may be used. Since the human body may be thought of as an electrically conductive vessel composed mainly of salt-containing water, it is mostly electrically conductive in a frequency range of several MHz. Meanwhile, the values of the DC resistance across both hands, as measured e.g., by a tester, range from 500 kΩ to 2.3 MΩ.

Figure 2A:
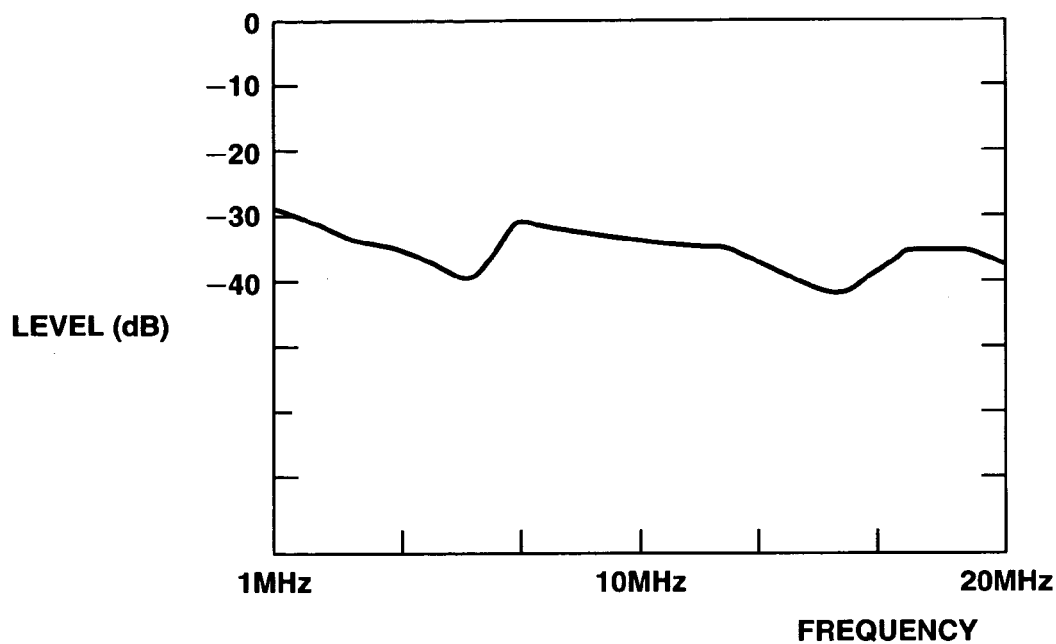
FIGS. 2A and 2B are graphs showing transmission properties across both hands of a user as measured using a spectrum analyzer within a range of 1 to 30 MHz.
Figure 2B:
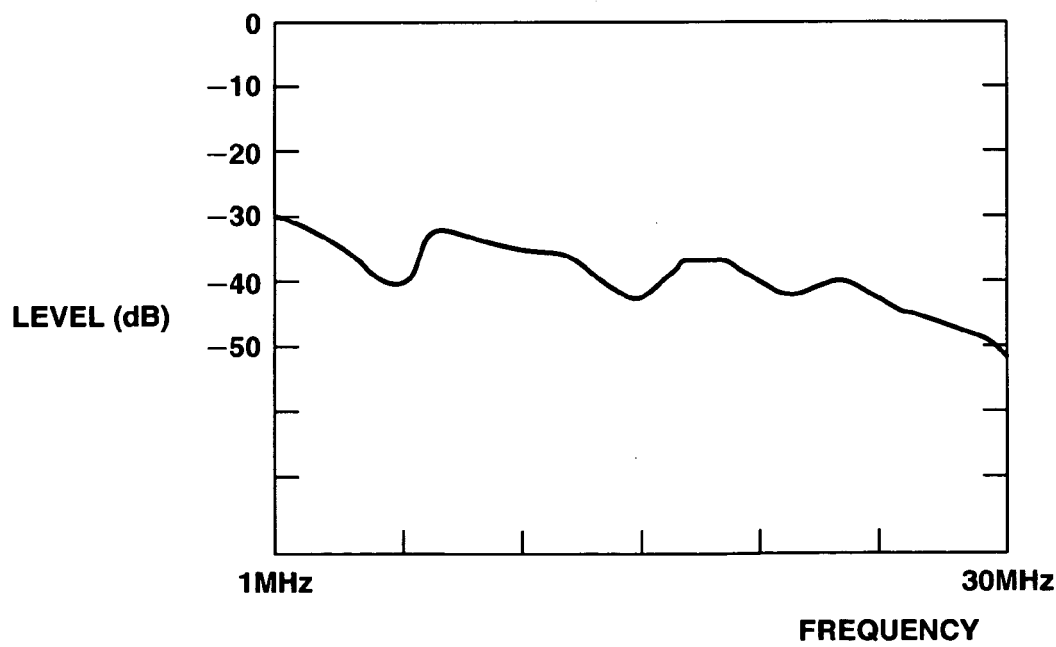

FIGS. 2A and 2B show transmission characteristics of the human body for AC. Specifically, FIGS. 2a and 2b show transmission characteristics across both hands of the human body as measured with a spectrum analyzer in a frequency range of from 1 MHz to 20 MHz and in a frequency range of from 1 MHz to 30 MHz, respectively. In both cases, a coaxial cable is connected to a tracking generator and to an input terminal. Meanwhile, the grounding points (GND) of the coaxial cable are connected in common to prevent the cable from serving as an antenna. Referring to FIGS. 2a and 2b, the transmission characteristics for 1 to 20 MHz are generally flat and exhibit attenuating characteristics of 30 dB to 40 dB.

The measured results shown in FIGS. 2a and 2b indicate that the output impedance of a tracking generator and an input impedance of the spectrum analyzer are both equal to 75Ω. So, if the impedance across both hands is e.g., 1 MΩ, in terms of AC, the attenuation should reach even −80 dB. However, the attenuation is far smaller than this value, thus supporting the possibility of signal transmission through the human body.

The data transmission side may be thought of as a minor dipole antenna such that the state of the electromagnetic field thereby generated has sufficiently been analyzed. Specifically, it indicates that the electromagnetic field generated by a human body is generated from the minute dipole antenna. The intensity of the electromagnetic field is expressed as a vector sum of components inversely proportional to the distance R from the antenna, inversely to the square of the distance R and inversely proportional to the third power of the distance R. These components are termed the radiating electromagnetic field, inductive electromagnetic field and static electromagnetic field, respectively. The mathematical equation expressing the above relation is stated in detail in the Japanese Laying-Open Patent H-7-170215.

Figure 3A:
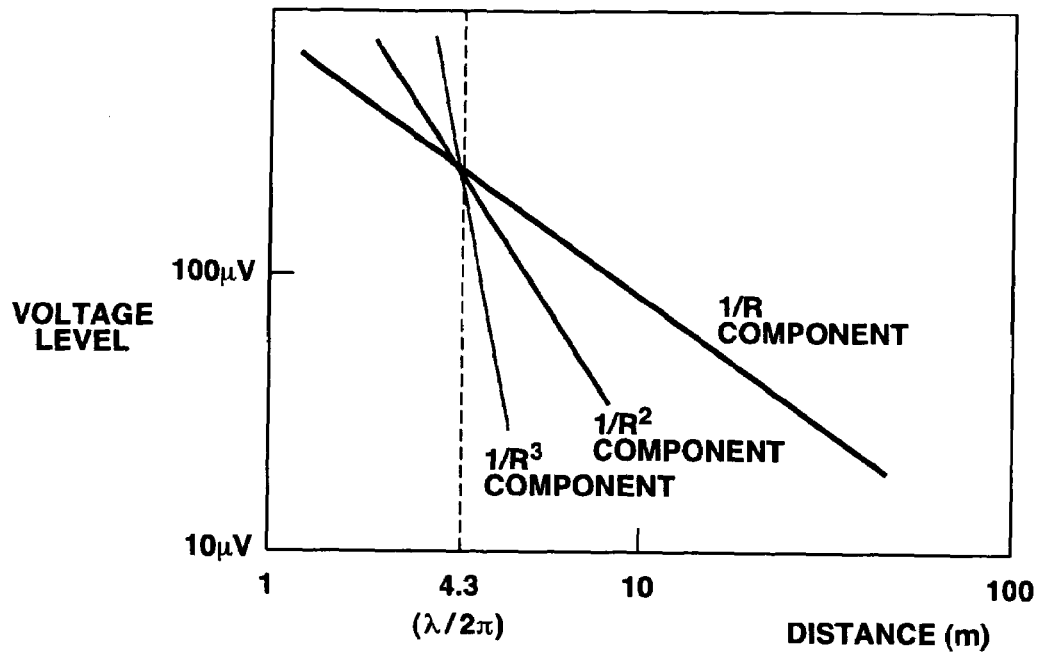
FIGS. 3A and 3B are graphs for illustrating the relation between the intensity of the electrical field and the distance from an antenna.
Figure 3B:
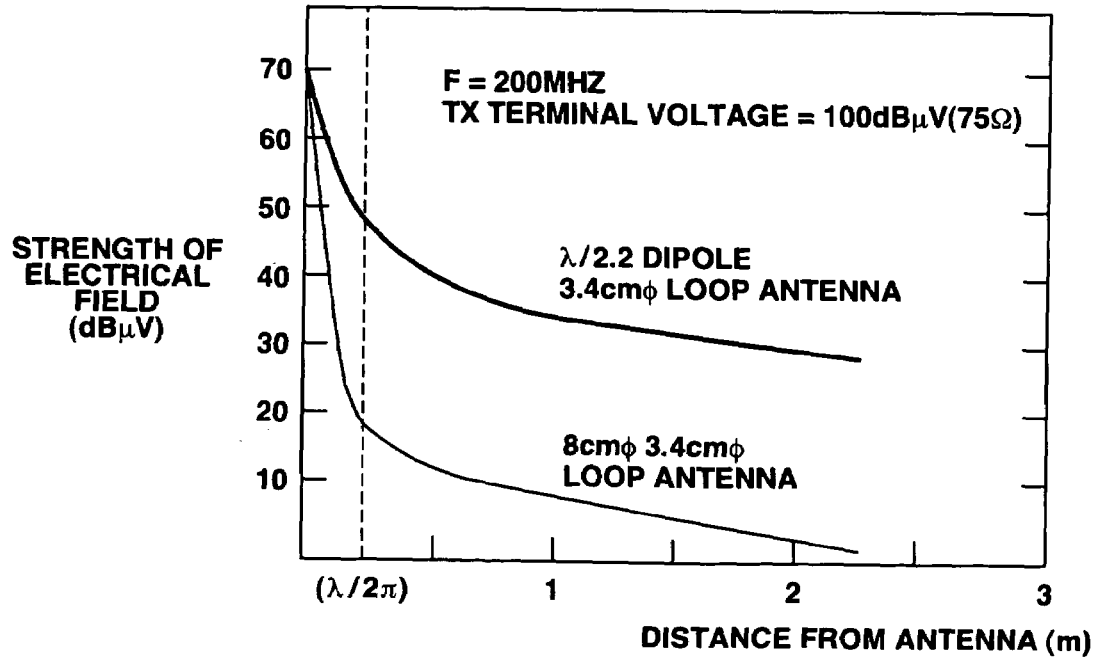

FIGS. 3A and 3B show the intensity of the electrical field. Specifically, FIG. 3a is a graph showing the relation between the respective terms of the intensity of the electrical field and the distance from the antenna. FIG. 3b shows the relation between the electrical field intensity and the distance of a dipole antenna of λ/2.2 and a loop antenna of 3.4 cmφ on one hand and a loop antenna of 8 cmφ and 3.4 cmφ, on the other hand, for a frequency f=200 MHz and a transmission terminal voltage=100 dBμV. As may be seen from FIGS. 3a and 3b, the intensities of the radiating electromagnetic field, inductive electromagnetic field and the static electromagnetic field (term of 1/R), term of 1/(square of R) and term of 1/(third power of R) become equal at a distance of λ/2π and is increased acutely as the distance diminishes. For f=11 MHz, this distance is approximately 4.3 m. In the authentication information communication system of the present invention, the transmission system mainly employing the static electromagnetic field is desirably applied.

As for the intensity of the electrical field, it is desirable to select a usable range of the electrical field intensity without limitations by the EMI (Electromagnetic Interference) regulations of the radio law. For example, the frequency is to be 332 MHz or less and the electrical field intensity is to be 500 μV/M or less.

The static electromagnetic field is attenuated by a third power of the distance R. For example, if the distance is increased from 1 m to 3 m, the intensity of the electrical field is 1/27 (1/3×3×3). Thus, if the distance from the data communication means is increased, the signal intensity is attenuated drastically. So, even if plural users are employing similar devices, the possibility of the signals of the other user being captured as noise is low, such that, even in an environment in which there are a large number of users employing similar devices in proximity to one another, communication mainly employing the static electromagnetic field can be had satisfactorily.

Meanwhile, the contact point 18 provided on the portable equipment 10 preferably is of a larger area and may be curved in profile so as to be wound about the finger, arm or neck of the human body, as a wrist watch, necklace, ring or a bracelet, so that the contact point will contact the skin of the human body over a wide contact area.

The portable equipment 10 includes a fixed data storage unit 16 and a variable data storage unit 17, as storage units for authentication data for memorizing an ID used for personal authentication, such as an authentication number of a credit card or ATM. In the fixed data storage unit 16 is stored a fixed server-native user identifier proper to the user.

In the variable data storage unit 17 is stored a variable user identifier, such as an identifier which is varied from one service offered by the service terminal to another. The modes and processing of these identifiers are explained subsequently in detail. Meanwhile, the fixed data storage unit 16 and the variable data storage unit 17 may be configured as memories removable with respect to the portable equipment 10.

As these fixed and variable user identifiers or the identification information which is based on these identifiers are sent from the communication unit 15 of the portable equipment 10 to the communication unit 25 of the service terminal 20, authentication check is made by the CPU 21 of the service terminal 20 to permit access to the information stored e.g., in the RAM 22 of the service terminal 20. Thus, the service terminal 20 is able to send the information stored in the RAM from the communication unit 25 of the service terminal 20 to the communication unit 15 of the portable equipment 10, whilst the portable equipment 10 on reception of the data is able to store the received data e.g., in a memory circuit of the RAM 12. Meanwhile, the ROM 13 of the portable equipment 10 or the ROM 23 of the service terminal 20 has stored therein an OS for managing the basic control of the respective devices, and the basic software, such as a device driver, so that, on turning on the power sources, the basic software thus stored may be read out by the CPU to operate the respective devices.

As the power source of the portable equipment 10, a small-sized power source of long useful life, such as lithium battery, not shown, is preferably used. The CPU 11 is fed with the power from the lithium battery to perform a variety of processing control operations, such as data readout, data transmission, data reception or data storage.

The communication between the portable equipment 10 and the service terminal 20 may be performed in such a manner that detection means provided on the service terminal 20 detects that a human body, that is a portion of the user 30, has touched the contact point 29 of the service terminal 20, with the service terminal 20 then being responsive to this detection to output a service identifier as later explained to the portable equipment 10 through the communication unit 25, contact point 29 and the user 30.

Alternatively, it is also possible for the communication unit 25 of the service terminal 20 to output service identifier data stored in service identifier storage means 28 continuously or at an interval of a few seconds. The data outputting interval of the communication unit 25 in this configuration is selected so that a transmission signal is received through the user 30 by the communication unit 15 of the portable equipment 10 carried by the user at least once every few seconds, that is whenever the user 30 touches the contact point 29 of the contact point 29 of the service terminal 20.

Conversely, the communication unit 15 of the portable equipment 10 may be configured for transmitting a signal, such as a user ID, stored in the fixed data storage unit 16 or variable data storage unit 17, continuously or every few seconds. The data outputting interval of the communication unit 25 in this configuration is also selected so that a transmission signal is received by the communication unit 25 of the service terminal 20 at least once every few seconds, that is whenever the user 30 touches the contact point 29 of the service terminal 20.

For the authentication processing, as later explained, the transmitted signal is data required for authentication, such as user ID or service identifiers.

After the authentication processing, a variety of processing operations, based on the authentication, such as opening/closure of a ticket gate, receipt/payment processing by ATM or the processing for furnishing the various contents information, such as the information on music, picture, map or commercial goods.

Meanwhile, the various contents information, such as the information on music, picture, map or commercial goods, may also be transferred through the human body, stored in the portable equipment, is output by outputting means, such as annexed display. If secret information is contained in the data for transmission, the transmission data may be encrypted on the data recording side for decoding on the receiving side. In this case, a variety of encryption processing means, such as random number generating means or timestamp processing means, are provided on the data transmission side. On the receiving side, there are provided decoding means for decoding the received encrypted data.

The communication unit, configured by the portable equipment 10 and the service terminal 20, transmits/receives signals by physical contact between the user 30 and the respective contacts 18, 19. The received signal is decoded by a demodulator provided in each communication unit and thence transferred through the network in each terminal or over a network outside the terminal to respective storage means, information processing means or authentication processing means, under control by the CPU 21.

Meanwhile, the portable equipment 10 may be configured for supplying the power to the CPU only when data transmission or processing is required. The useful life of the battery of the portable equipment 10 may be protracted by a configuration in which the power supply is started responsive to a reception signal from the service terminal 20.

Certain specified examples of the authentication processing and data transfer processing in the authentication information communication system shown in FIG. 1 are hereinafter explained. Assume that the user 30 wearing the portable equipment 10 has contacted the service terminal 20 by the contact point 29. If the user 30 has contacted the service terminal 20 for the first time, the registration processing for authentication is performed.

For authentication registration processing, the service terminal 20 generates user identification data for authentication (variable user identifier) in a user identifier generating unit for authentication 26 to transmit this user identification data (variable user identifier) along with the service identifier 28 through the communication unit 25 to the communication unit 15 of the communication terminal 10. The transmitted user identification data (variable user identifier) is stored in the variable data storage unit 17 of the portable equipment 10.

Figure 4:
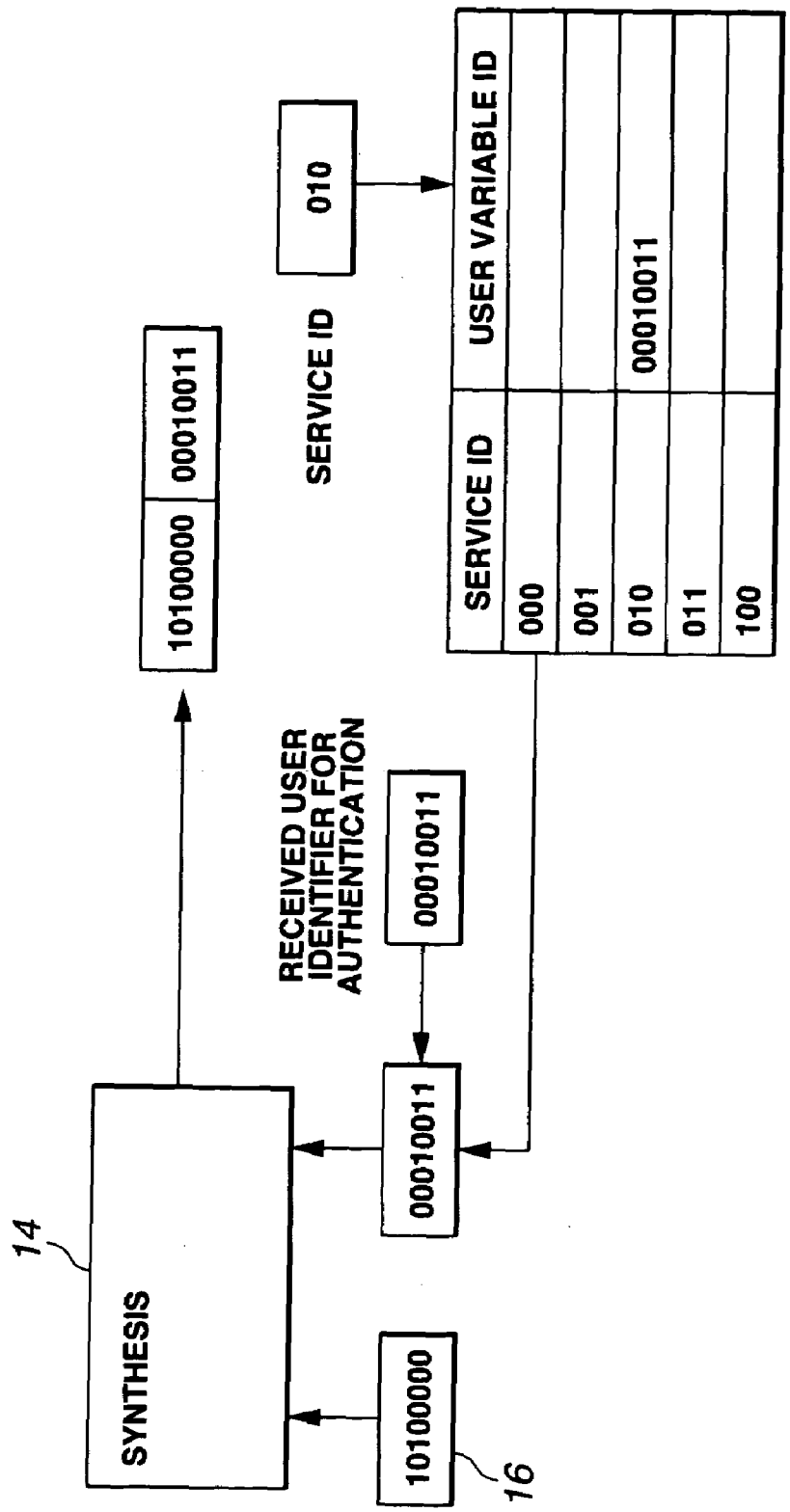
FIG. 4 illustrates the processing in a user side portable equipment in the authentication processing of the authentication information communication system according to the present invention.

The configuration of the variable data storage unit 17 and the processing in a synthesis unit 14 are shown in FIG. 4. The variable data storage unit 17 is of a table structure, shown for example in FIG. 4, and is configured for memorizing the user identification data for authentication (variable user ID: 00010011) for a record having a service identifier received from the service terminal 20, such as service ID: 101, as a key.

The synthesis unit 14 of the portable equipment 10 synthesizes the user identification data for authentication (variable user (ID): 00010011) received from the service terminal 20 to the server-native fixed identifier (fixed user identifier (ID): 10100000) stored from the outset in the fixed data storage unit 16.

The identifier generated by the synthesis processing in the synthesis unit 14 is the service-native user identifier which is valid only for the user identified by the fixed user ID:

10100000 and which also is valid for the service, for example, the service prescribed by e.g., the service ID: 101, that is for specified services.

The portable equipment 10 transmits to the service terminal 20 the service-native user identifier, valid for the specified service, and which is generated by the synthesis unit 14, for example, the user identifier (ID) [10100000/00010011] for the service stated on the upper right side of FIG. 4. This service-native user identifier, transmitted from the portable equipment 10 to the service terminal 20 through the human body, is received by the communication unit 25 of the service terminal 20 through the contact point 18 of the portable equipment 10, user 30 and the contact point 29 of the service terminal 20.

The received data is memorized in a data storage unit for authentication 27. This data storage unit for authentication has a hash table structure similar to that of the variable data storage unit 17, that is a table structure having a fixed user identifier as a user identifier for authentication, as a key, and memorizes the received service-native user identifier in a table.

If the user 30 has not contacted the service terminal 20 for the first time, the portable equipment 10, receiving data of the service identifier 28 held by the service terminal 20, such as data 010, takes out the user identifier for authentication (variable user ID) corresponding to the service identifier and which has been received from the variable data storage unit 17, based on the received service identifier, to execute the synthesis processing with the server-native fixed identifier (fixed user ID) stored in the fixed data storage unit 16 to generate the service-native user identifier which is transmitted to the service terminal 20.

Referring to FIG. 4, a specified example of this processing is explained. Assume that the service identifier furnished by the service terminal 20 is [010], the service terminal 20 is an information furnishing terminal installed in a convenience store, and that the service identifier [010] specifies a goods discount ticket issuing service. A user having the portable equipment 10, enclosed e.g., in a wrist-watch, touches his or her finger or palm on the contact point 29 of the service terminal 20 installed in the convenience store. The service terminal 20 detects the finger or the palm by a sensor provided on the contact point 29 to retrieve the service identifier [010] from a service identifier holder 25 which is output through the communication 25 to the user 30. The service identifier [010] is received by the user's skin and the portable equipment 10 of the wrist-watch type, having the contact point 18, through the human body of the user 30.

The portable equipment 10, which has received the service identifier [010] retrieves the variable data storage unit 17 to take out [00010011] as a variable user ID corresponding to the service identifier [010] to send the variable user ID [00010011] thus taken out to the synthesis unit 14. The synthesis unit 14 synthesizes the variable user ID [00010011] and the fixed user ID [10100000] stored in the fixed data storage unit 16 to produce service-native user identification data [1010000000010011] valid for the specified service. This service-native user identification data is sent to the communication unit 25 of the service terminal 20 through the communication unit 15, contact point 18, human body of the user 30 and the contact point 29 of the service terminal 20.

Figure 5:
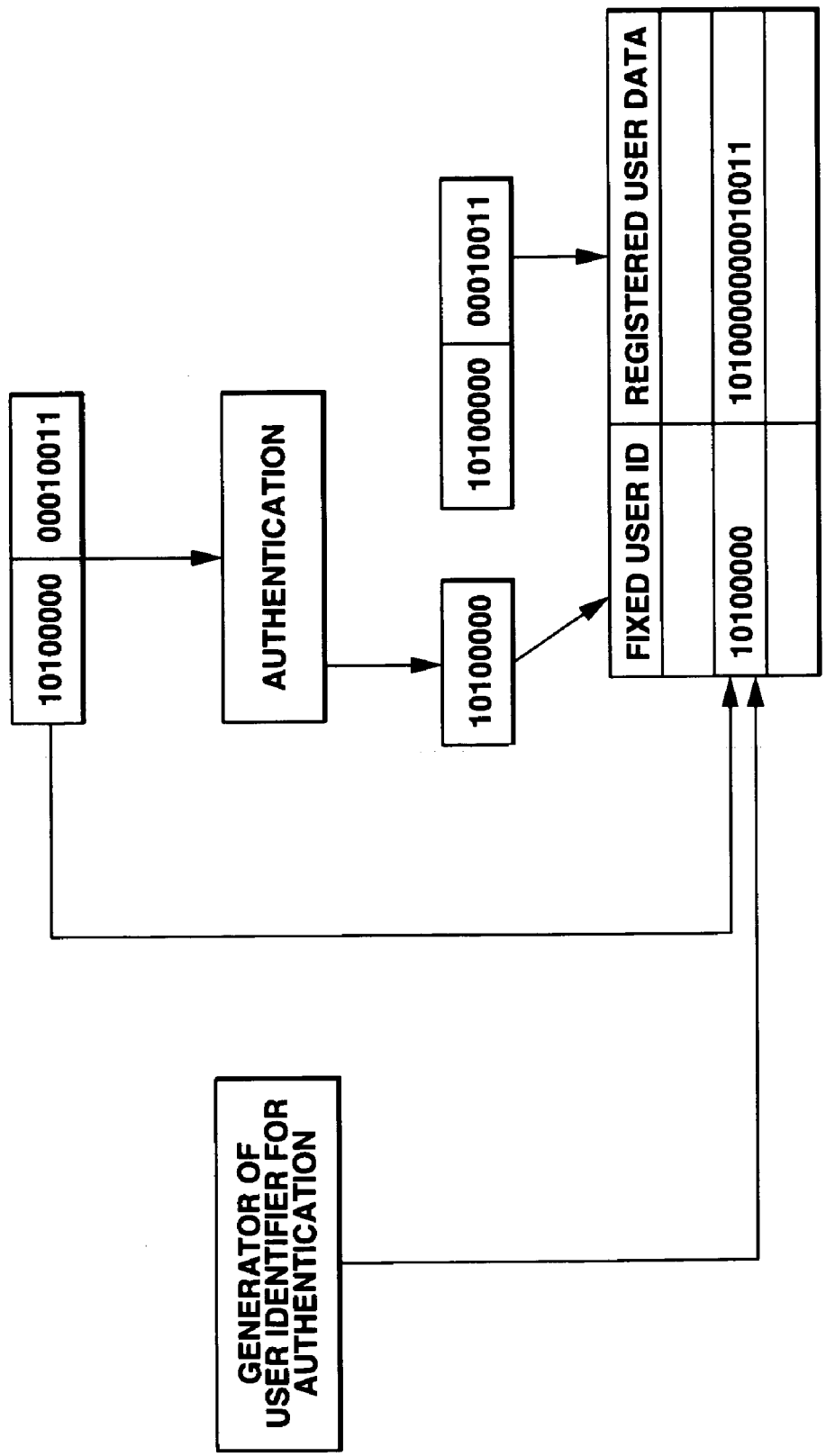
FIG. 5 illustrates the processing in a service terminal in the authentication processing of the authentication information communication system according to the present invention.

The service terminal 20, which has received the service-native user identification data, valid for the specified user through the above processing from the portable equipment 10, performs the authentication processing. This authentication processing is now explained by referring to FIG. 5.

On reception of the service-native user identification data transmitted from the portable equipment 10, that is the above-mentioned data [1010000000010011], the service terminal 20 performs the operation of separating the data in an authentication unit 24 into the fixed user ID [10100000] and variable user ID [00010011]. The service terminal 20 also accesses the data storage unit for authentication 27 to verify whether or not these identifiers correspond to the ID registered in the data storage unit for authentication 27, by way of performing the authentication processing. If data collation has been made correctly, that is if authentication has been made, the service terminal 20 executes the service prescribed in the service terminal 20, that is the service corresponding to the service identifier [010], for example, the goods discount ticket issuing service. In the service terminal, there is provided a goods discount ticket issuing means connected to or enclosed in the service terminal. This goods discount ticket issuing means starts the goods discount ticket issuing operation, based on the result of the authentication processing.

The variable user ID can be constituted as data representing the period as set by e.g., the service terminal 20 as being a period during which a goods discount ticket can be issued. By this arrangement, the service terminal 20 which has received the variable user ID checks the valid period from the variable user ID to verify that the user is entitled to authentic service only during the valid period to execute the service. In the case of a commutation ticket, the period and domain data are jointly registered in the variable user ID so that its validity can be determined solely from the variable user ID received from the portable equipment.

The services presented by the service terminal 20 may be opening/closing processing of an entrance gate, wicket gate, entrance to a building, or entrance to a laboratory, or may also be a variety of services, such as receipt/payment processing in ATM. If the service is the opening/closure of the ticket gate, the wicket is opened based on the authentication processing to permit only the authenticated user to pass through the wicket. In this case, the contact point 29 is provided in each ticket gate.

If the service terminal 20 holds plural service identifiers and a table, having stored therein the service-native user identification data in association with each service identifier, it is possible to offer different services to each person.

In the above-described embodiment, the fixed user ID and the variable user ID are simply joined together as synthesized data which is used as the service-native user identification data. The service-native user identification data may be generated not only by the above-described method, but also by a configuration in which a new data string is generated by e.g., a pre-defined function, based on the fixed user ID and the variable user ID, with the data string so generated being then sent to the service terminal 20 for decoding by the service terminal 20. It is also possible to output only the variable user ID to the service terminal 20 which then executes authentication processing based only on the variable user ID to determine whether or not the user identification and service execution are feasible. Since the service terminal 20 is configured for setting the variable user ID for a user depending on services, it is possible to get a variety of information pieces, such as the information of each user, the information on the services furnished or limitations, contained in the data of the variable user ID.

If the service terminal 20 is a terminal furnishing the information, the variable information pieces, such as music or picture information furnished based on the authentication processing, may be displayed on demonstration means, such as a display, provided in the service terminal 20. Moreover, similarly to the authentication data, the picture information etc. may be transmitted from the service terminal to the user through the human body. The mode of transmitting the picture or speech information through the human body is described in detail in out previous present application (Japanese Laying-Open Patent H-7-170215) filed by the same assignee as that of the present application.

Figure 6D:
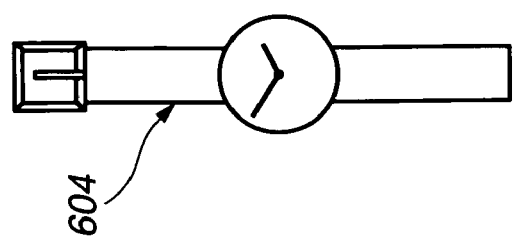
FIGS. 6A, 6B, 6C, and 6D illustrate an illustrative structure of a portable equipment in the authentication information communication system according to the present invention.
Figure 6C:
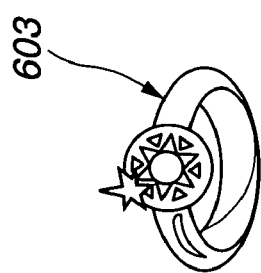
Figure 6B:
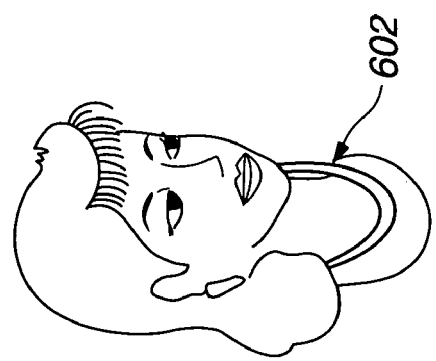
Figure 6A:
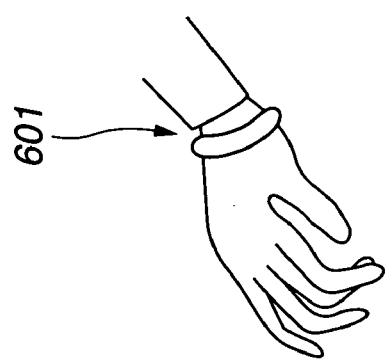

FIGS. 6A, 6B, 6C, and 6D show an example of a portable equipment 10. Specifically, FIG. 6a shows a structure in which a contact point is provided on a bracelet 601 and a structure as the portable equipment 10 shown in FIG. 1 is enclosed. FIG. 6b shows a structure in which a contact point is provided on a necklace 602 and a structure as the portable equipment 10 shown in FIG. 1 is enclosed, whilst FIG. 6c shows a structure in which a contact point is provided on a ring 603 and a structure as the portable equipment 10 shown in FIG. 1 is enclosed. FIG. 6d shows a structure in which a contact point is provided on a wrist watch 604 and a structure as the portable equipment 10 shown in FIG. 1 is enclosed. The contact point of the bracelet 601, necklace 602, ring 603 and the wrist watch 604 are provided on the sides contacting the human body, that is on the inner peripheral side, such as to permit data transmission between the portable equipment 10 and the service terminal 20 through these respective contact points and physical contact points of the human body contacting the contact point 29 of the service terminal 20, shown in FIG. 1, such as the human body, as the user, or the finger or the palm of the user. Thus, the portable equipment 10 is designed as a wrist-watch, necklace, ring, hair band, or a bracelet configured for being worn by the finger, arm, neck, leg or foot of the user.

Figure 7:
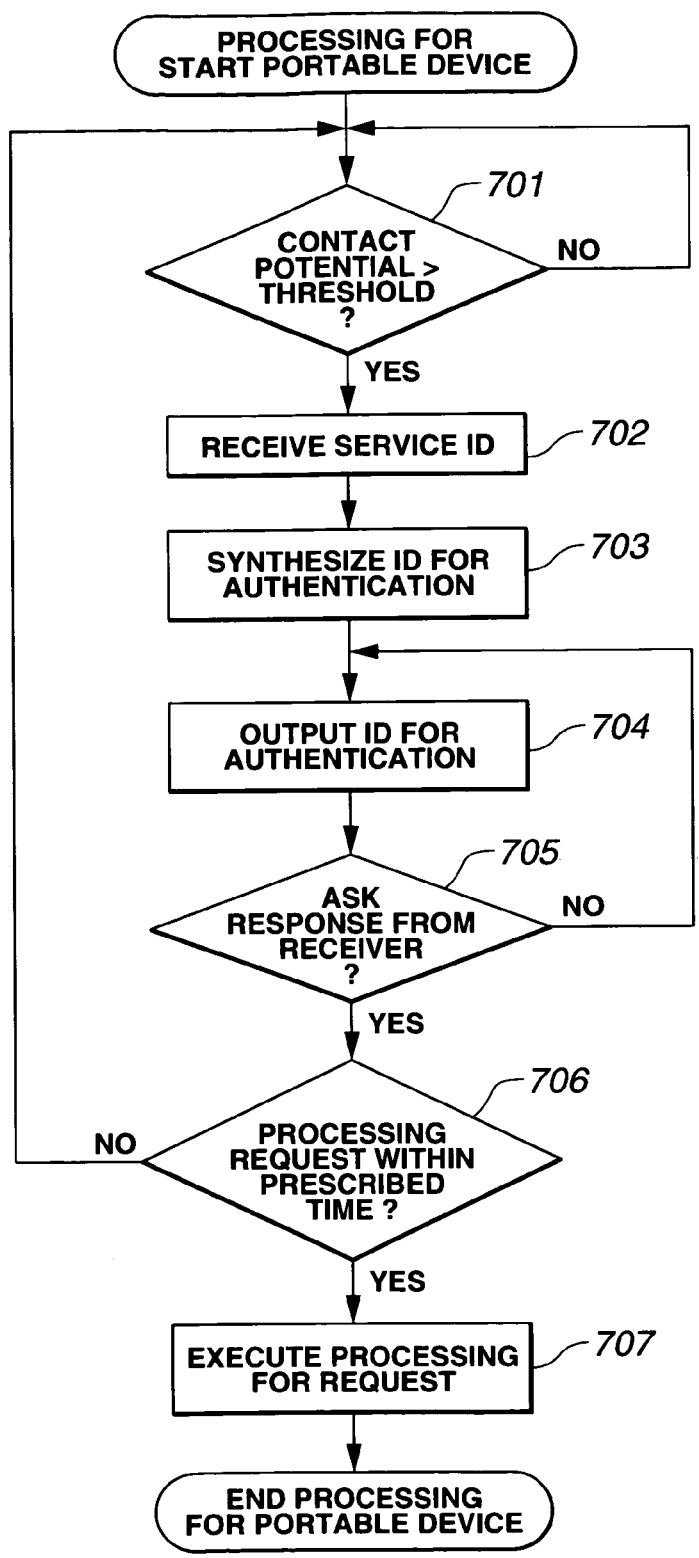
FIG. 7 illustrates the processing flow in the portable equipment in the authentication information communication system according to the present invention.
Figure 8:
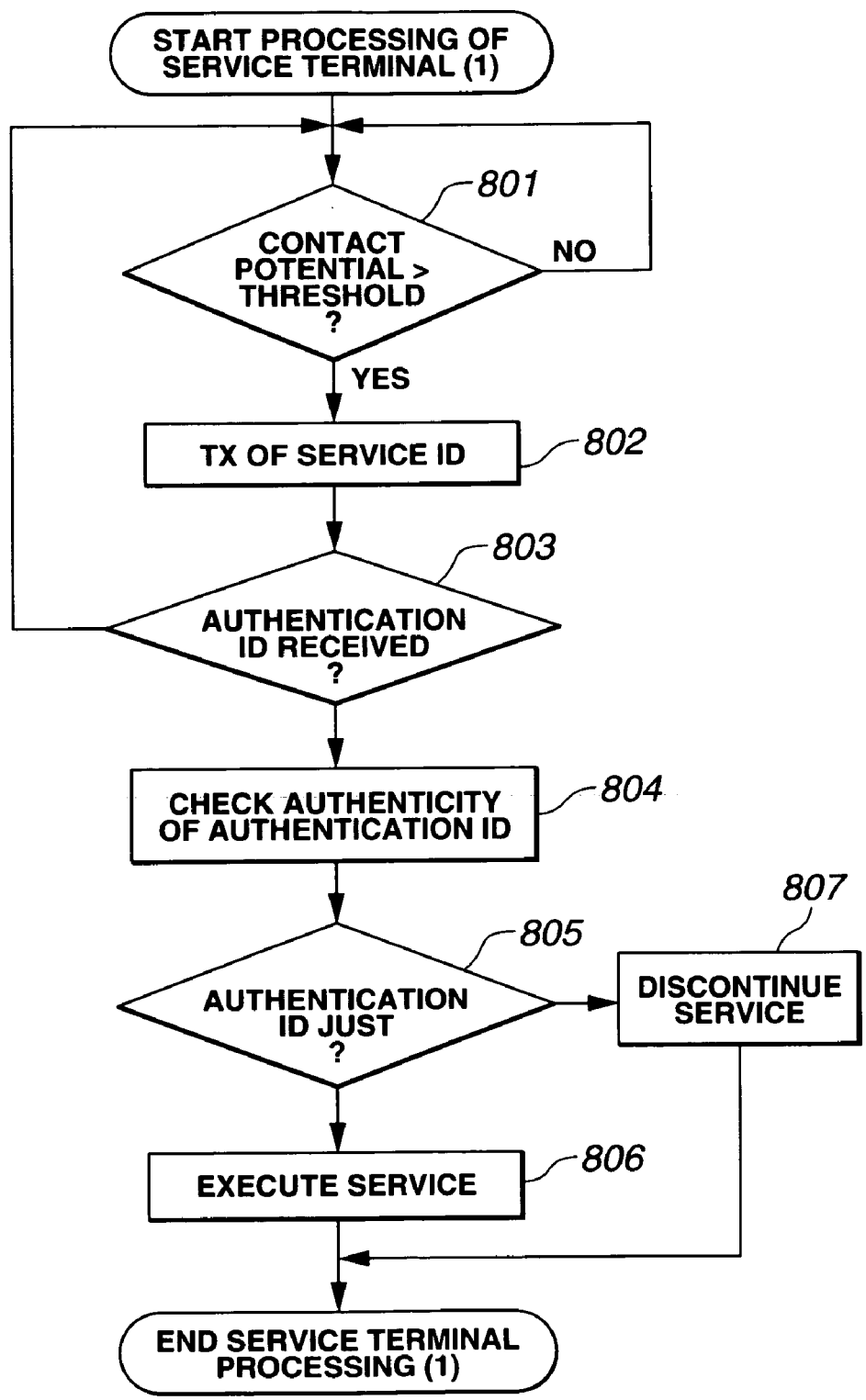
FIG. 8 illustrates the processing flow in a service terminal in the authentication information communication system according to the present invention.
Figure 9:
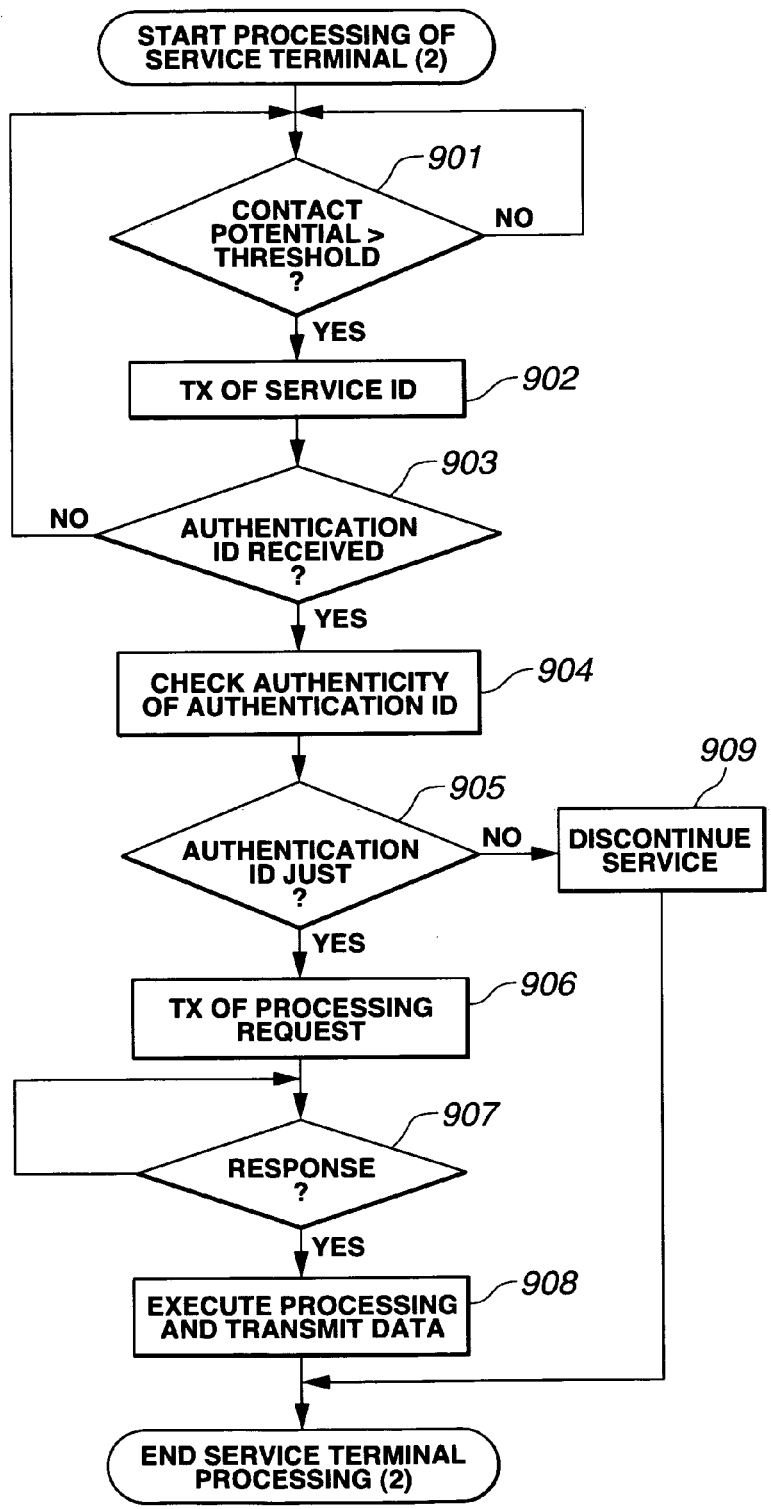
FIG. 9, continuing to FIG. 8, illustrates the processing flow in the service terminal in the authentication information communication system according to the present invention.

Referring to FIGS. 7 to 9, the authentication processing flow in the authentication processing communication system of the present invention is now explained. FIG. 7 shows a processing flow of the portable equipment 10 in the authentication processing communication system shown in FIG. 1, while FIGS. 8 and 9 show a processing flow in different embodiments of the service terminal 20 in the authentication processing communication system shown in FIG. 1.

First, the processing flow of the portable equipment 10 of FIG. 7 is explained. The step 701 is a step for ascertaining rise in potential at the contact point 18, that is a step for verifying the potential of the contact point 18 with the potential necessary for data reception as a threshold value. When the contact point potential reaches a level permitting data reception, a service ID sent at step 702 from the service terminal 20 through the human body of the user 30 is received.

On reception of the service ID, the portable equipment 10 at step 703 takes out the variable user ID corresponding to the received service ID from the variable data storage unit 17, while taking out the fixed user ID from the fixed data storage unit 16 to synthesize the IDs in the synthesis unit 14 to generate an ID for authentication. At step 704, the portable equipment 10 outputs the generated ID for authentication to the service terminal 20 through the human body.

The portable equipment 10, which has output the ID for authentication to the service terminal 20, waits at step 705 for an ACK response from the reception side, that is from the service terminal. If the ACK response is received, the portable equipment 10 waits for a further processing request from the service terminal (step 706). If a request is made, the portable equipment 10 executes processing at step 707.

The flow shown in FIG. 7 is the processing flow assumed to occur at a specified service terminal, for example, in a bank ATM. The processing as from step 705 in the flow of FIG. 7 differs depending on the mode of the service terminal. If the service terminal 20 is a bank terminal, the ACK response at step 705 in the flow of FIG. 7 differs depending on the modes of the service terminal. If the service terminal 20 is a bank terminal, the ACK response at step 705 corresponds to the ACK display processing on a display after authentication based on the output ID at step 704 is made. The processing request at step 706 is a request for the amount to be drawn, while the execution of processing at step 707 corresponds to the processing for amount designation by a user.

If the service terminal is a wicket gate, and an ID for authentication is output from the portable equipment of the user at step 704, the terminal connected to the wicket gate as the service terminal executes the opening/closure based on the result of authentication. Thus, the processing flow of FIG. 7 differs depending on the processing furnished by the service terminal.

A typical processing at the service terminal is explained by referring to FIG. 8, showing an example of services only for processing the operation of an equipment such as a ticket gate of a railroad station. The step 801 is a step for ascertaining the rise in the potential of the contact point 29 for data transmission. When the contact point potential reaches the data transmission enabling state, a service ID is transmitted at step 802 through the human body and the contact point 29 to the portable equipment 10.

The portable equipment 10 which has received the service ID takes out from the variable data storage unit 17 the variable user ID corresponding to the received service ID, while taking out the fixed user ID from the fixed data storage unit 16. The portable equipment 10 then performs synthesis at the synthesis unit 14 to generate an ID for authentication which is output to the service terminal 20. On reception of the ID for authentication at step 803, the service terminal 20 at step 804 executes authentication processing of the ID for reception authentication. This processing is executed by the authentication unit 24 of FIG. 1. If, as a result of authentication in the authentication unit 24, the validity of the authentication ID is verified to be valid at step 805, the services as set on the service terminal is executed at step 806. If the services are verified at step 805 not to be authentic services, the processing transfers to step 807 where the services are discontinued to terminate the processing.

A different processing example at the service terminal side is explained with reference to FIG. 9. The example of FIG. 9 is a processing example for services furnishing the various information items such as picture information, music information and other information. The step 901 is a step for ascertaining the rise in the potential of the contact point 29, that is a step for verifying the potential of the contact point 29 with the potential necessary for data transmission as a threshold value. When the contact point potential reaches a transmission enabling state, the service ID is transmitted at step 902 from the service terminal 20 through the body of the user 30 to the portable equipment 10.

On reception of the service ID, the portable equipment 10 takes out a variable user ID corresponding to the received service ID from the variable data storage unit 17, while taking out the fixed user ID from the fixed data storage unit 16 to synthesize the two IDs in the synthesis unit 14 to generate an ID for synthesis which is output to the service terminal 20. On reception of the ID for authentication from the portable equipment 10 at step 903, the service terminal 20 at step 904 executes the authentication processing of an ID for reception authentication. This processing is executed by the authentication unit 24 in FIG. 1. If, as a result of the authentication by the authentication unit 24, the authenticity of the ID for authentication is checked at step 905 and determined to be not valid, the services are discontinued to terminate the processing. If the ID for authentication is determined to be valid at step 905, a processing request prescribed at the service terminal is output at step 906. Then, at step 906, a response to the processing request is awaited. If a response is made, the processing is executed at step 908 to transmit the requested data.

In the above-described processing at the service terminal shown in FIGS. 8 and 9, the flow of FIG. 8, for example, corresponds to an instance of a security check service in a building. In this case, the service at step 806 is the controlling of the opening/closure of a building door, whilst the service interruption at step 807 means cessation of the door opening/closure operation. The processing of registering an invalid ID may also be performed as a processing accompanying the service cessation at step 807.

The processing flow of FIG. 8 is equivalent to an instance of settlement services in a communication system. In this case, the services at step 806 may be configured not only for controlling the opening/closure of a wicket gate but also for electronic settlement processing if fee settlement is required.

Figure 10B:
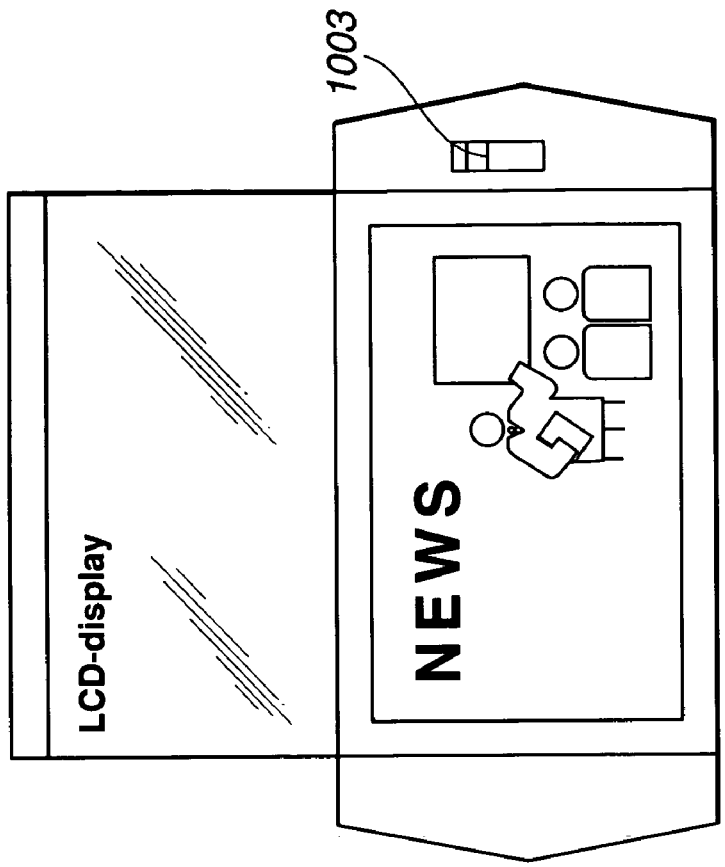
FIGS. 10A and 10B illustrate an example of using the authentication information communication system according to the present invention.

The processing flow of FIG. 8 may also be applied as a portable telephone set or a using form of a portable terminal having a display. For example, the processing employing (a) a portable telephone set or (b) a display equipment such as PDA in FIG. 10. It is noted that the portable terminal of FIG. 10a is a service terminal featuring an electrically conductive contact point, whilst the display terminal shown in FIG. 10b is a service terminal featuring an electrically conductive jog dial.

Figure 10A:
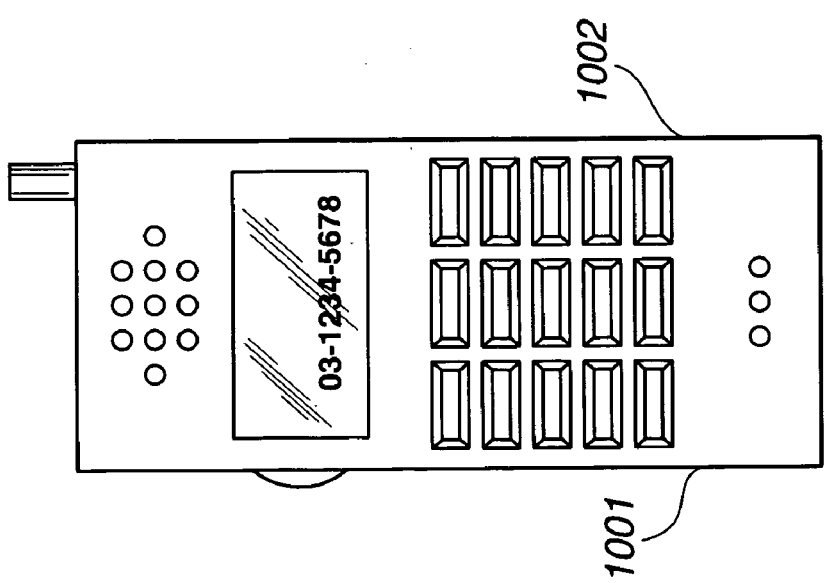

If, in the portable terminal of FIG. 10a, the processing at the service terminal of FIG. 8 is executed, and the using configuration is such that a portable telephone as a service terminal is used by plural persons, user identification data is transmitted from a portable equipment, such as a wrist watch, to a portable telephone, through the body of the user 30, to permit the portable telephone to be used only if authenticity of the ID for authentication. The service at step 806 of FIG. 8 in this case is the setting processing to a call enabling mode. A telephone number list corresponding to the ID for authentication may be demonstrated in a display area of the portable telephone. If, in the case of a display equipment, such as PDA, shown in FIG. 10b, online shopping is to be performed, it may be envisaged to use the above configuration as a system for performing authentication with a service provider for settlement, using the ID for authentication as a base.

Among the examples of service terminals, executing the processing flow shown in FIG. 9, there is a remote equipment controlling equipment. For example, in a hospital where electrical waves are generated, use of portable telephones is limited. There may now be realized a terminal which is able to furnish services enabling the use of a telephone equipment to a bed-ridden patient.

Figure 11:
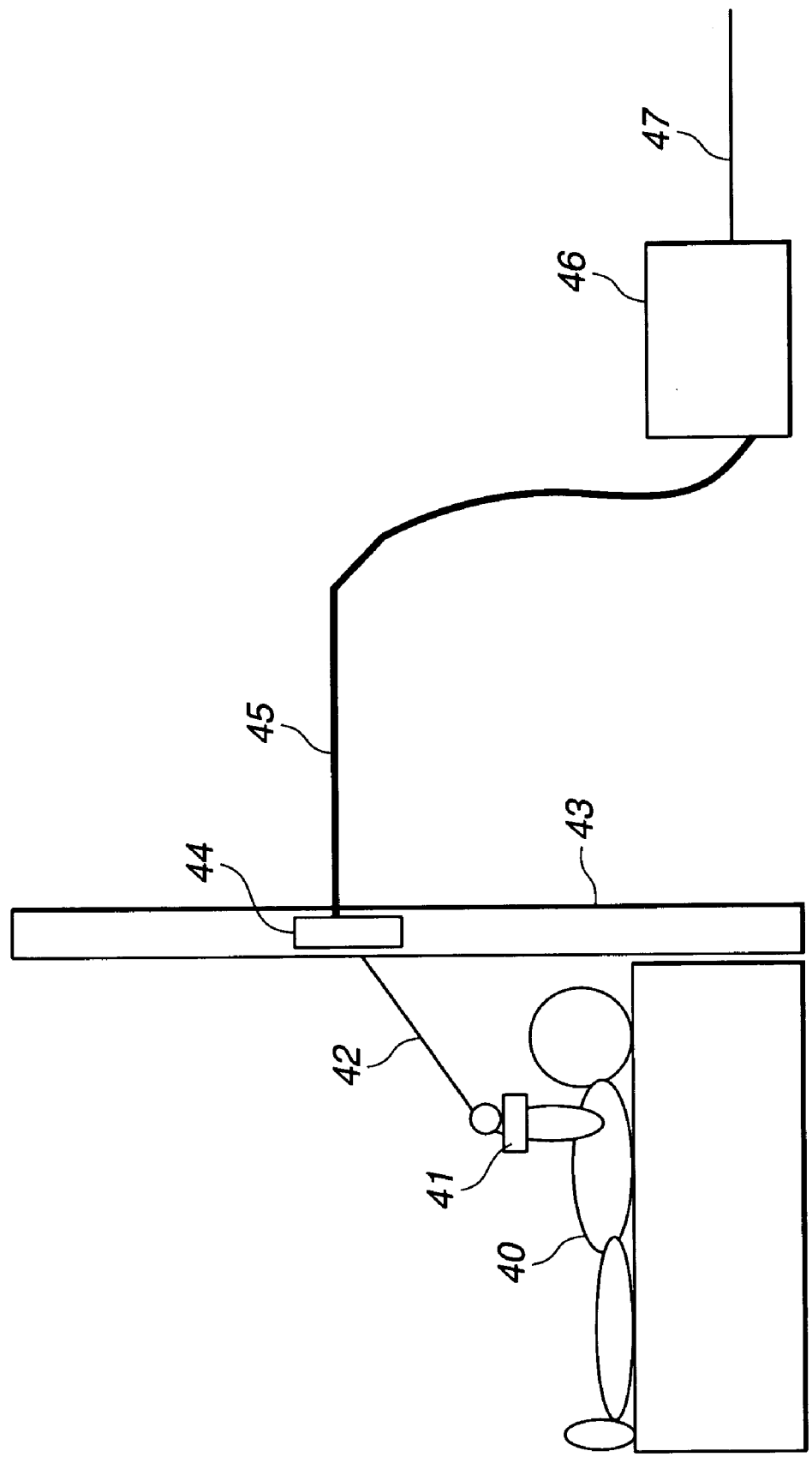
FIG. 11, continuing to FIG. 10, illustrates an example of using the authentication information communication system according to the present invention.

Referring to FIG. 11, an example of a service terminal executing the processing flow shown in FIG. 9 is explained. A patient 40 wears a wrist-watch type portable equipment 41 having a display. A patient desirous to call on a telephone touches a wire-like contact point 42 hung from the wall to have communication with a service terminal 44 or with a remote service terminal through a wall 43.

By the patient 40 having the wire-like contact point 42, a service ID is transmitted at step 902 from the service terminal 44. An ID for authentication is sent from the portable equipment 41, responsive thereto, so that authenticity check of the ID for authentication is carried out at step 904 at the service terminal 44.

If authenticity is verified by the authentication processing, a processing request is made, that is, an output of telephone number data is requested to the patient at step 906. The telephone number data is configured for being output by speech or through a telephone number inputting key provided on the portable equipment 41 by the patient. On reception of these telephone numbers, the service terminal 44 at step 908 executes telephone connection processing. In this configuration, a modem function is built in the service terminal 44. The service terminal 44 is further connected through a circuit in the precincts 45 to a digital switcher 46, by which the user is able to call on the telephone to outside through an external public telephone network.

If the service terminal 44 has the function of an automatic answering telephone, the corresponding information may be received by the portable equipment 41 by the patient having the wire-like contact point 42. The information can then be reproduced, using the replay function of the portable equipment 41, after separating the contact point 42.

Embodiment 2

Figure 12:
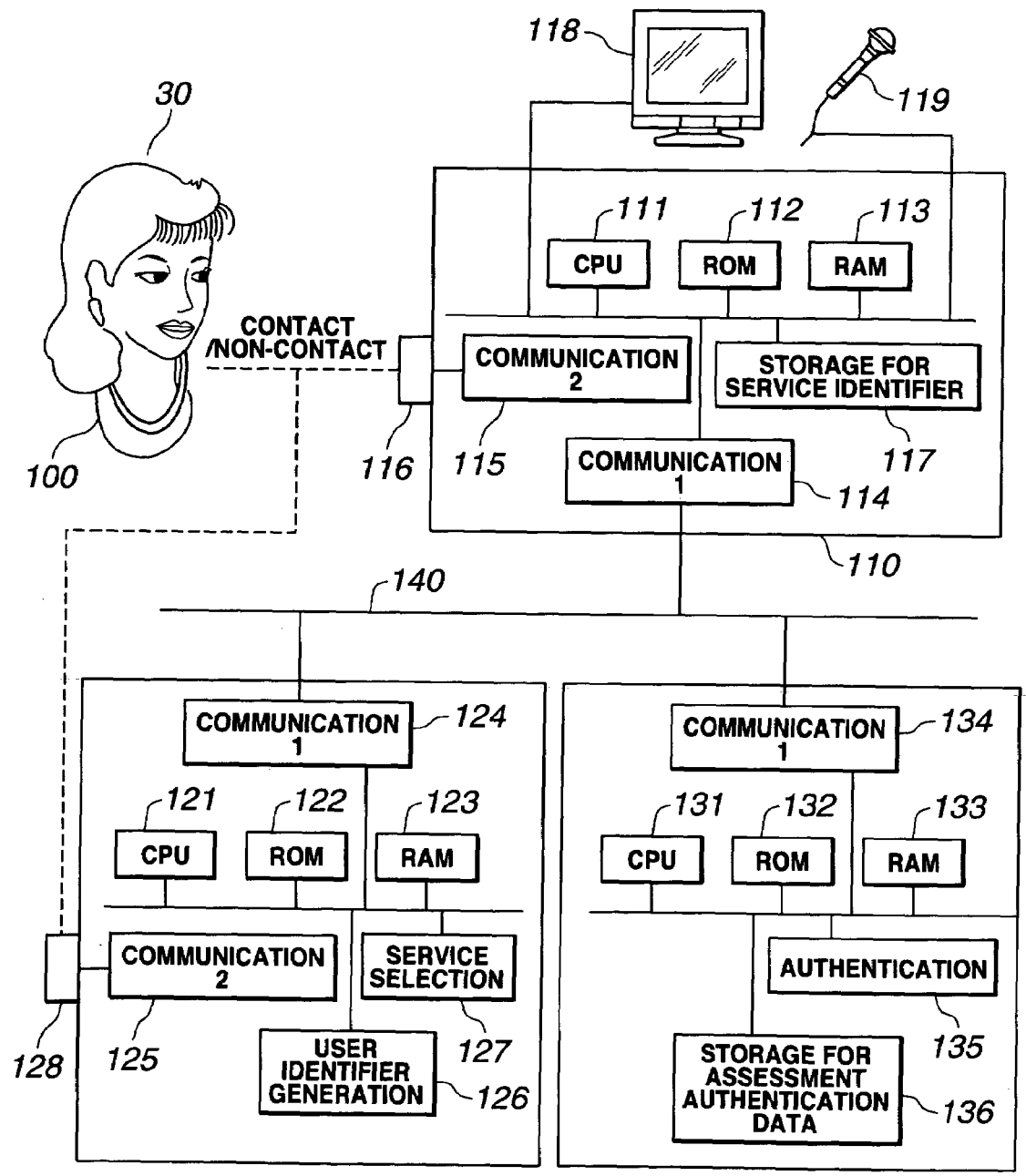
FIG. 12 is a block diagram for illustrating the structure of a second embodiment in the authentication information communication system according to the present invention.

An illustrative system configuration in which the authentication information communication system is made up of a portable equipment 100 worn by a user, a service furnishing terminal 110, a service registration terminal 120 and a clearing house 130 for performing user management, such as authentication or assessment, as shown in FIG. 12, is now explained as a second embodiment.

The service furnishing terminal 110 is a terminal furnishing real services, for example, a terminal furnishing contents information, such as music or picture information, or a terminal provided in many variable places for furnishing variable services, such as ticket gate of a recreation park or a wicket gate of a railroad station. Although only one service furnishing terminal 110 is shown in FIG. 12, plural service furnishing terminals 110 are provided in necessary places through a network 140. For example, if the service terminal is to execute wicket gate opening/closing processing operations, plural service furnishing terminals 110 are provided at respective gate positions. In FIG. 12, only one structure is shown for avoiding complexity.

A CPU 111 of the service furnishing terminal 110 forwards the information stored in a RAM 113 from circuit units 2, 115 of the service furnishing terminal 110 to a communication unit of the portable equipment 100. On reception of the data, the portable equipment 100 stores the received data in a storage circuit, such as a RAM in the portable equipment 100. Meanwhile, communication units 1, 114 are used for communication with the service registration terminal 120 and with the clearing house 130. In a ROM 112 of the service furnishing terminal 110, there are stored basic software items, such as OS or device drivers, adapted for performing basic control of the respective devices, and are read out by the CPU 111 to operate the respective devices.

The service registration terminal 120 is a terminal where a user 30 effects registration necessary for receiving services from the service furnishing terminal 110. If, for example, the service furnishing terminal 110 is a wicket gate of a railroad station, the service registration terminal 120 is provided in a railroad station where the commutation ticket or railroad tickets are sold. If the service furnishing terminal 110 is an entrance gate of a recreation park, it is installed in an entrance ticket selling spot. If the service registration terminal 120 is a furnishing terminal of the contents information, such as music or picture information, the service registration terminal 120 is installed in, for example, an information furnishing terminal installed in a convenience store or a railroad station, or as an ATM device.

A CPU 121 of the service registration terminal 120 forwards the information stored in a RAM 123 from the communication unit 2 or 125 in the service registration terminal 120 to a communication unit in the portable equipment 100. On reception of data, the portable equipment 100 is able to store the received data in a storage circuit, such as a RAM, provided on the portable equipment 100. It is noted that a communication unit 1 or 124 is used for communication with the service furnishing terminal 110 or with the clearing house 130. In a ROM 122 in the service registration terminal 120, there are stored basic software items, such as OS or device drivers, adapted for performing the basic control of the respective devices, and are read out by the CPU 121 to operate the respective devices.

The service registration terminal 120 is provided with input/output equipment for registration processing, such as a display, a microphone or a loudspeaker for information input/output. The user 30 carrying the portable equipment 100 has communication through the contact point 128 provided in the service registration terminal 120 even when the user has communication with the service registration terminal 120. When the user carrying the portable equipment 100 touches the service registration terminal 120 at the contact point 128, the potential at the contact point 128 in the service registration terminal 120 rises to permit communication. The service registration terminal 120 then first requests the user to execute service selection processing.

Figure 13:
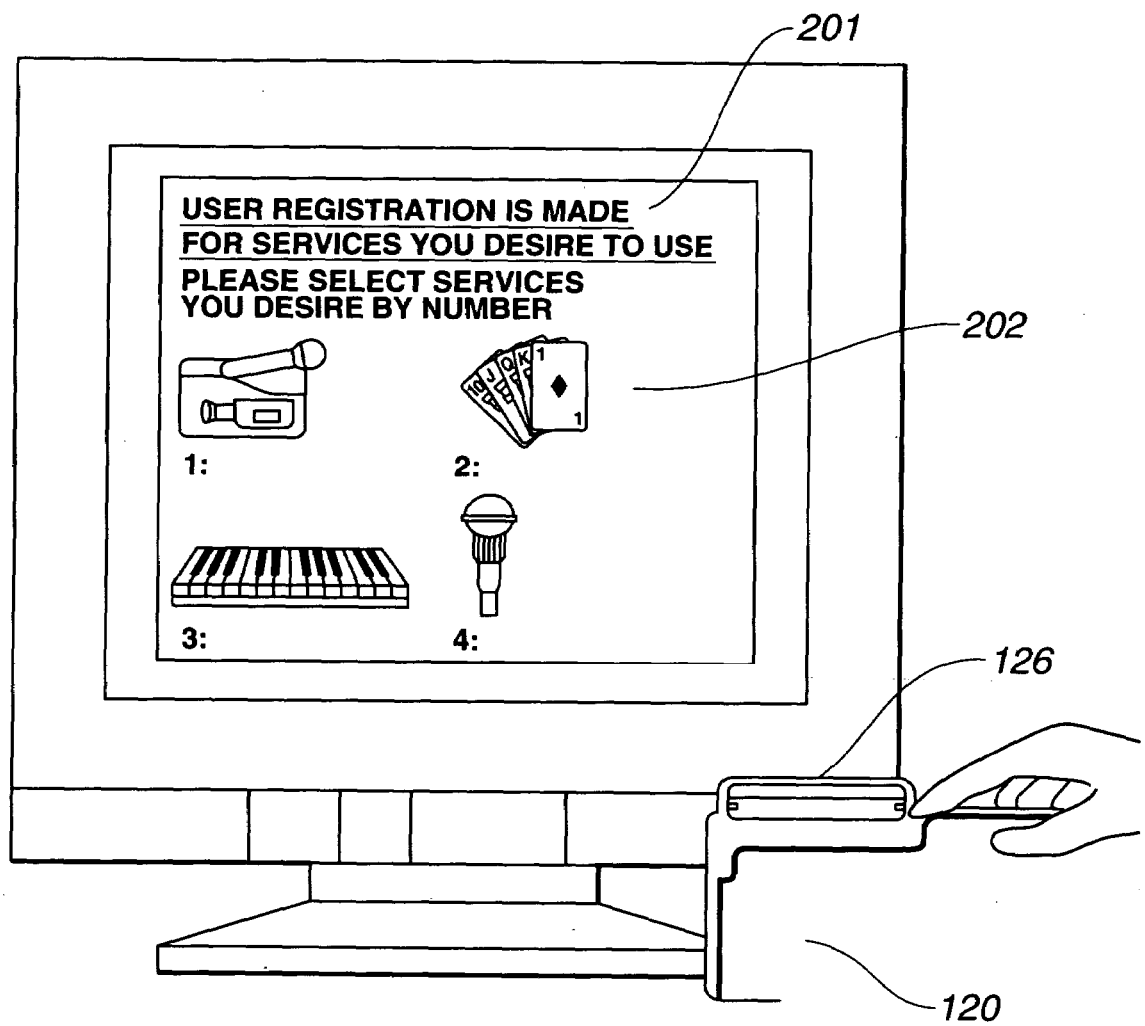
FIG. 13 illustrates typical processing at a service registration terminal of the second embodiment in the authentication information communication system according to the present invention.

A service selection unit 127 in the service registration terminal 120 demonstrates for the user a message 201 shown in FIG. 13 on a display provided on the service registration terminal 120 or on a display arranged in circuit with the service registration terminal 120 to prompt the user to select one of service items in a selection picture 202.

When the user 30 selects one of the service items from the selection picture 202 of the display shown in FIG. 13, by inputting means, such as a touch input, a keyboard input or the speech input, the service registration terminal 120 forwards a service identifier, matched to the service as selected by the user 30, to the portable equipment 100 worn by the user 30, through the communication unit 2 or 125 and the contact point 128.

On reception of the service identifier, the portable equipment 100 of the user selects the variable user ID (see FIGS. 1 and 4) as in the first embodiment. If the user 30 has not utilized the services even once, the variable user ID is an initialized value, such as 0.

The synthesis unit 14 of the portable equipment 100 of the user 30 (see FIGS. 1 and 4) synthesizes data of the fixed storage unit, that is fixed user ID provided as a fixed value for the user at the outset, and the variable user ID corresponding to the services stored in the variable data storage unit 17, to generate a service-native user identifier, which is transmitted to the service registration terminal 120 so as to be received by the communication unit 2 or 125.

The service registration terminal 120 has communication with the clearing house 130, using the communication units 1, 124, to execute authentication processing for the user 30.

The clearing house 130 includes a service furnishing terminal 110, a work area for a program executed by communication units 1, 134 for executing communication with the service registration terminal 120, a ROM 132 having stored therein a basic software, such as an OS for performing basic control or a device driver, and a program executed by the CPU 131, and a RAM 133 for temporarily storing input data, and executes authentication processing for the user 30. The authentication processing for the user 30 is such that the communication unit 1, 14 receives authentication data of the user 30 through the Internet or the like communication circuit 140, and received data is sent to an authentication unit 135 where the processing similar to that explained in connection with FIG. 4 is carried out to execute authentication processing.

The authentication processing is performed using a registration table 14 memorized in an assessed amount authentication data storage unit 136 of the clearing house 130. The assessed amount authentication data storage unit 136 of the clearing house 130 includes a registration table of a data structure shown for example in FIG. 14. In this registration table, there can be set the maximum number of times of use and the current number of times of use from user to user. The registration table 14 is merely illustrative such that items corresponding to service modes, such as service using duration, service using time, service using territories or other service details are set depending on the services furnished.

When the registration table shown in FIG. 14 is used, the following three modes may be thought of as the statuses of the registration table of the assessment amount authentication data storage unit 136 from user to user:

(1) The user 30 already has used certain services in the past, in his or her using hysteresis, such that there is already a record having a coincident user ID in the assessment amount authentication data storage unit 136, however, there is no record corresponding to the present request service;

(2) since the user has used the same service as that requested now, there is the corresponding fixed ID record; and (3) since the user has not used the services, the user ID has not been registered.

In (1) and (3) of the above modes, user registration is newly required for the service requested by the user 30. So, the request for registration processing is notified to the service registration terminal 120, which then executes a user registration processing for the service requested by the user 30. Specifically, a user identifier generating unit 126 generates a user identifier (variable user identifier) and transmits the user identifier so generated from the communication unit 2, 125 through the contact point 128 and the user 30 to the portable equipment 10 of the user along with the service identifier of the relevant service. The portable equipment 100 of the user 30 causes a pair of the received service identifier and the variable user identifier to be stored in association with the variable data storage unit 17 (see FIG. 4).

The user, who has registered the service identifier and the variable user identifier associated with the service identifier in the variable data storage unit 17 of the portable equipment 100, synthesizes the fixed user identifier of the fixed data storage unit and the variable user identifier, now received, by the synthesis unit 14 of the portable equipment 100, to generate a service-native user identifier, which then is forwarded to the service registration terminal 120, thereby requesting the service registration terminal 120 to execute user registration processing.

The service registration terminal 120, which has received the request for user registration, requests user registration by transmitting the received service-native user identifier to the clearing house 130. On reception of the service-native user identifier, the clearing house 130 prepares a record corresponding to the service-native user identifier for the own assessment amount authentication data storage unit 136 to set the maximum number of times of use to a pre-set value as well as to initialize the current number of times of use to 0.

The user 30, who has executed the above procedure and has completed the user registration, holds the service-native user identifier in the variable data storage unit of the portable equipment 100 and hence is able to receive the requested service through the service furnishing terminal 110.

The user 30 desirous to be furnished with a service touches the contact point 116 of the service furnishing terminal 110 to get the service identifier for the portable equipment 100 through the human body of the user 30. The portable equipment 100 is responsive thereto to synthesize the registered variable user ID and the fixed user ID to generate a service-native user identifier which is transferred to the service furnishing terminal 110.

This service-native user identifier is transferred through e.g., a network, to the clearing house 130, where the authentication processing and updating of the number of times of use of the registration table of the assessed amount authentication data storage unit 136 are executed. The authentication processing is similar to that of the previous embodiment. Through this procedure, the user 30 is able to receive a service from the service furnishing terminal 110 up to the number of times of use.

The case of (2), that is the case in which the service requested for the present time was used in the past such that a corresponding fixed ID record exists in the registration table, is explained. The case of (2) may be divided further into the following two cases: (2-1) The current number of times of use is not in excess of the maximum number of times of use; and (2-2) the current number of times of use has already exceeded the maximum number of times of use.

In the case of (2-1), the clearing house 130 forwards a message: "registration is not required" to the service registration terminal 120. On reception of this message, the service registration terminal 120 advises that effect to the user 30 to terminate the processing. In the case of (2-2), the clearing house 130 sends a message: "updating is required". On reception of this message, the service registration terminal 120 advises the user 30 of that effect to make inquiry as to whether or not updating is to be performed. If the user agrees to the updating, the clearing house 130 is asked to perform updating.

The updating processing in the clearing house 130 is specifically the processing of setting the current number of times of use of the record corresponding to the registration table of the assessed amount authentication data storage unit 136 to 0. If the user 30 is not willing to agree to the updating, an inquiry is made to the user 30 as to whether or not the record in the registration table of the assessed amount authentication data storage unit 136 is to be deleted. If the user 30 has agreed to the record deletion, the clearing house 130 is requested to delete the record. The clearing house 130 then deletes the record from the assessment amount authentication data storage unit 136. If the user is not willing to delete the record, the service registration terminal 120 instantly terminates the processing.

Figure 15:
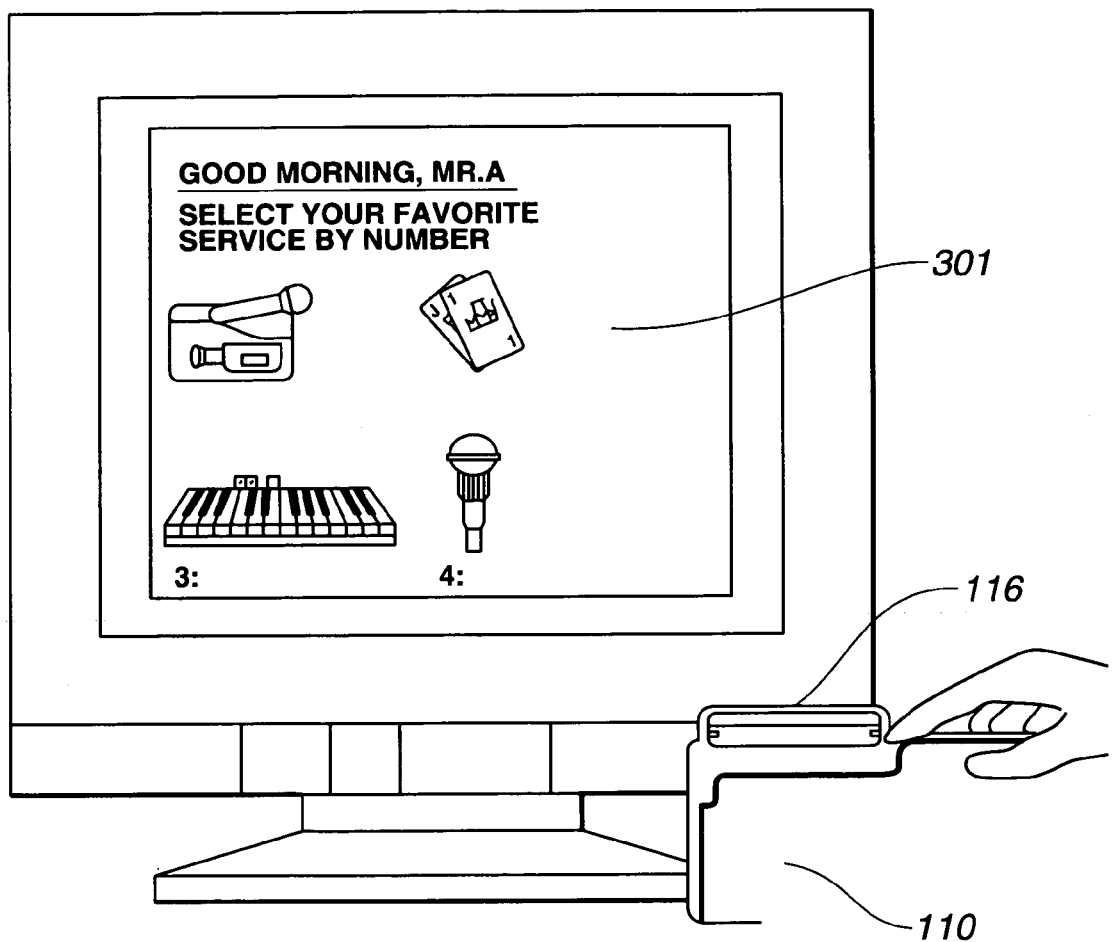
FIG. 15 illustrates typical processing at a service furnishing terminal of the second embodiment in the authentication information communication system according to the present invention.
Figure 16:
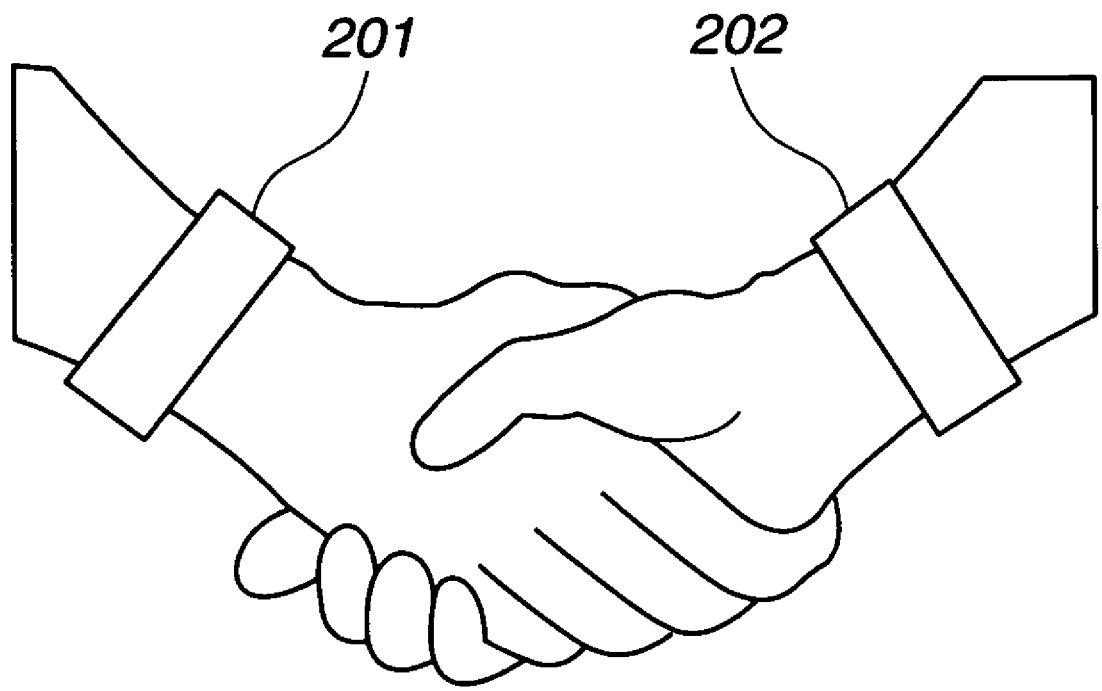
FIG. 16 illustrates an instance of using other embodiments in the authentication information communication system according to the present invention.

The processing for such a case wherein a user 30 owning the portable equipment 100 contacts the service furnishing terminal 110 with a contact point 116 to be furnished with the service is now explained. To the service furnishing terminal 110 are annexed a demonstration display 118 and a microphone 119 as a data input/output equipment adapted for furnishing the service, such that, when the service is initiated, there is demonstrated a guide presentation on the demonstration display 118 as shown for example in FIG. 15. On the demonstration display is displayed a service selection picture 301.

When the user 30 touches the contact point 116 of the service furnishing terminal 110, the service furnishing terminal 110 reads out data of a service identifier storage unit 117 to transmit the service identifier to the portable equipment 100 of the user 30 through the communication units 2, 115, contact point 116 and the body of the user 30.

Referring to FIG. 4, the processing following reception of the service identifier is explained. Assume that the service identifier is [010]. Since [00010011] is stored as variable user identifier in a record corresponding to the service identifier [010] in the variable data storage unit 17 of the portable equipment 100, the fixed user identifier stored in the fixed data storage unit 16 is synthesized to the variable user identifier in the synthesis unit 14 to generate e.g., data [1010000000010011].

This data, which is a user identifier native to the service, is forwarded to the service furnishing terminal 110. The service furnishing terminal 110, which has received the data, then forwards the data to the clearing house 130 to make request for user authentication and assessment processing. On reception of the service-native user identification data transmitted from the service furnishing terminal 110, the authentication unit 135 executes the processing of separately generating the fixed user identifier [10100000] and the variable user identifier [00010011], based on the server-native user identifier, and subsequently proceeds to access the assessed amount authentication data storage unit 136 to make authentication as to whether or not the user has been registered.

If the authentication has been made correctly in the assessed amount authentication data storage unit 136, using the registration table shown in FIG. 14, a message "authentication OK" is sent to the service furnishing terminal 110, at the same time as the current number of times of use of the record in the assessment amount authentication data storage unit is decremented by one. The service furnishing terminal 110, which has received the message "authentication OK" from the clearing house 130, furnishes the service.

If authentication in the clearing house 130 has failed, a message "authentication has failed" is demonstrated on a display 118 annexed to the service furnishing terminal 110 to terminate the processing.

In the above embodiment, data sent from the communication units 1, 114, communication units 2, 115, communication units 1, 124, communication units 2, 125 and the communication units 1, 134 may be forwarded as they are encrypted so that the data will be received by the respective communication units and subsequently decoded.

The above-described embodiment refers to a configuration in which the service furnishing terminal 110 mainly furnishes the information using a display. Alternatively, the service the user is desirous to receive may also be a an opening/closing operation of a wicket gate of a railroad station or a recreation park, in which case the service furnishing terminal 110 is constituted as a wicket gate in each of the railroad stations or in each of plural sites in the park. In this case, the service furnishing terminal 110 of FIG. 12 is provided in association with each gate. The user 30 touches the contact point 116 of the service furnishing terminal 110 and transfers the server-native user identifier generated by synthesis processing, herein a pre-set domain and a pre-set time duration of a commutation ticket, to the service furnishing terminal 110 and to the clearing house 130 to effect authentication processing, assessment or liquidation processing so as to open the wicket gate only when the authentication processing is valid.

The authentication processing is performed by executing the communication through the portable equipment 100 worn by the user and through the service furnishing terminal through the user, as explained above. So, the contact point 116 is a contact point provided in each gate. The authentication processing is executed by the user 30 wearing the portable equipment 100 touching the contact point 116 and, if the authentication is valid, the gate is opened.

In this case, the registration processing in the service registration terminal 120 is a terminal where the user 30 effects necessary registration in order to receive a service. The service registration terminal 120 is installed in a railway station where the commutation ticket or a railway ticket is sold or in an entrance ticket sale spot.

The registration in the service registration terminal 120 is started by the user 30 touching the contact point 128 of the service registration terminal 120. If the service is a specified service, such as sale of a commutation ticket, the station domain and valid period are set and data of the station domain and valid period are registered in a registration table in the assessment amount authentication data storage unit 136 of the clearing house 130. The user authentication processing is executed as reference is made to the registration table. In this manner, variable services can be furnished by the service registration terminal, whilst the authentication processing and management on the service basis and on the user basis are also feasible.

The foregoing explanation has been centered basically about the instance of the portable equipment to be authenticated. The portable equipment may also not be in need of the authentication, for example, the authentication function of the present portable equipment may be turned off, or the user is unconditionally held to be valid. In such case, the portable equipment may also be used as an information exchange equipment, that is as an external information inputting system. For example, if a contact point is built into a pre-set location in an electric rolling stock, such as a portion of an advertisement or a hand strap, the advertisement information in the electric rolling stock may be input to the portable equipment. Alternatively, the information may be retrieved into a memory in the portable equipment or the information may be output through a display or a loudspeaker annexed to the portable equipment.

Moreover, if two users wearing wrist-watch or bracelet type portable equipment 201, 202 shake hands, data transfer may be realized between the portable equipment 201, 202 through the human bodies of the two persons shaking their hands. Moreover, if the authentication processing configuration is enclosed in the portable equipment 201, 202, the information can be transferred between the persons carrying the authenticated portable equipment, however, the information transfer is not realized to an unauthenticated counterpart.

Although the present invention has been explained with reference to particular embodiments thereof, it is apparent that those skilled in the art can make suitable corrections or substitutions of the above-described embodiments without departing from the scope of the invention. The present invention has been disclosed only by way of illustration and should not be interpreted in a limiting fashion. The scope of the present invention is to be interpreted in light of the description of the following claims.

What is claimed is:

1. An authentication information communication system made up of a portable information processing device executing the communication through a human body, and a service furnishing device, wherein said portable information processing device includes a contact point A contacting the human body to establish a communication path through said human body;

fixed data storage means for storing fixed user identification data capable of identifying a user;

variable data storage means for storing variable user identification data corresponding to at least one of a plurality of services furnished by said service furnishing device;

synthesizing means for synthesizing said fixed user identification data and said variable user identification data to create authentication data; and outputting means for outputting said authentication data to said service furnishing device, wherein said service furnishing device includes a contact point B contacting the human body to establish a communication path through said human body; and control means for controlling service execution based on the results of the authentication processing, wherein said authentication data is used to determine a service to be executed.

2. The authentication information communication system according to claim 1 wherein said service furnishing device includes means for generating user identification data for authentication corresponding to a service to be furnished; and wherein said portable information processing device is configured for receiving user identification data for authentication generated by said means adapted for generating user identification data for authentication from said service furnishing device through said contact points A and B for storage as variable user identification data in said variable user identification data storages means.

3. The authentication information communication system according to claim 1 further comprising:

user management means for executing authentication processing for a user; said user management means having a registration table having registered therein the user registration state and the service use state from one registered user to another, said user management means being configured for executing the authentication processing based on said registration table.

4. The authentication information communication system according to claim 1 further comprising:

service registration means for registering a service furnished to the user; said service registration means including means for generating user identification data for authentication corresponding to a service to be furnished by said service furnishing device; said portable information processing device being configured for storing the user identification data for authentication generated by said service registration means in said variable user identification data storage means as variable user identification data.

5. The authentication information communication system according to claim 1 wherein said variable user identification data includes the information for setting the service mode of a service furnished by said service furnishing device.

6. A portable information processing device for executing communication with a service furnishing device through a human body, said portable information processing device includes
   a contact point A contacting the human body to establish a communication path through said human body;
   fixed data storage means for storing fixed user identification data capable of identifying a user;
   variable data storage means for storing variable user identification data corresponding to at least one of a plurality of services furnished by said service furnishing device;
   synthesizing means for synthesizing said fixed user identification data and said variable user identification data to create authentication data; and
   outputting means for outputting said authentication data to said service furnishing device, wherein said authentication data is used to determine a service to be furnished.

7. The portable information processing device according to claim 6 in which said variable user identification data is stored in said variable data storage means in association with a service identifier; wherein
   corresponding variable user identification data is extracted from said variable data storage means, based on the service identifier received from said service furnishing device to output the data for authentication which is based on the extracted variable user identification data.

8. The portable information processing device according to claim 6 wherein said variable user identification data includes the mode setting information for the service furnished by said service furnishing device.

9. The portable information processing device according to claim 6 wherein said contact point A is curved in profile to follow the mounting side of the human body.

10. The portable information processing device according to claim 6 adapted for being mounted on one of a finger, an arm, a neck, a leg, a foot or a hand of the user.

11. The portable information processing device according to claim 6 enclosed in any of a wrist-watch, a necklace, a ring a hair band or a bracelet.

12. The portable information processing device according to claim 6 wherein said fixed data storage means and the variable data storage means are removable with respect to the portable information processing device.

13. A method for authentication information communication executed by a portable information processing device including a contact point A adapted for establishing a communication path through a human body on having contact therewith and a service furnishing device including a contact point B adapted for establishing a communication path through a human body on having contact therewith, said method comprising:
   a step of transmitting service identification data from said service farnishing device to said portable information processing device through said contacts B and A;
   a step of extracting variable user identification data stored in a variable user identification data storage means corresponding to said service identification data and extracting fixed user identification data stored in a fixed user identification data storage means;
   a step of generating data for authentication based on the synthesis of the variable user identification data and the fixed user identification data as extracted;
   a step of outputting said data for authentication from said portable information processing device to said service furnishing device through said contact points A and B; and
   a step of controlling service execution in said service furnishing device based on the results of authentication, wherein said data for authentication is used for determining a service to be executed.

14. The method for authentication information communication according to claim 13 wherein said service furnishing device executes the step of authentication processing executing the authentication processing based on said data for authentication transmitted from said portable information processing device through said contact points A and B;
   said control step controlling the service execution based on the result of authentication processing of said authentication processing step.

15. The method for authentication information communication according to claim 13 wherein said service furnishing device includes
   a step of generating user identification data for authentication corresponding to a service to be furnished;
   said portable information processing device receiving user identification data for authentication generated in said step of generating the user identification data for authentication, from said service furnishing device through said contacts B and A, and for storing the so-received data in said variable user identification data storage means as variable user identification data.

16. The method for authentication information communication according to claim 13 further comprising:
   a user management step of executing authentication processing for a user; said user management step including a step of generating a registration table having registered therein the user registration state and the service using state from one registered user to another;
   said authentication processing being carried out based on said registration table.

17. The method for authentication information communication according to claim 13 further comprising:
   a step of registering a service to be furnished to a user;
   said service registration step including a step of generating user identification data for authentication corresponding to a service furnished by said service furnishing device;
   said portable information processing device having a step of storing the user identification data for authentication generated in said service registration step in said variable user identification data storage means as variable user identification data.

18. In a system for authentication information communication executed by a portable information processing device having a contact point A adapted for establishing a communication path through a human body on having contact therewith and a service furnishing device having a contact point B adapted for establishing a communication path through a human body on having contact therewith, a program furnishing medium for tangibly furnishing a computer program which causes a processing executed on a service furnishing device to be executed on a computer system, said computer program comprising:
   a step of outputting service identification data from said service furnishing device through said contact point B to said portable information processing device;

a step of receiving data for authentication generated by said portable information processing device based on synthesized fixed user identification data and variable user identification data corresponding to said service identification data through said contact point B; and a step of controlling the service execution based on the result of authentication processing, wherein said data for authentication is used to determine a service to be executed.

19. In a system for authentication information communication executed by a portable information processing device having a contact point A adapted for establishing a communication path through a human body on having contact therewith and a service furnishing device having a contact point B adapted for establishing a communication path through a human body on having contact therewith, a program furnishing medium for tangibly furnishing a computer program which causes a processing executed on a service furnishing device to be executed on a computer system, said computer program comprising:

a step of receiving service identification data output from said service furnishing device to said portable information processing device through said contact out A;

a step of extracting fixed user identification data from a fixed data storage means and variable user identification data corresponding to said service identification data from a variable user identification data storage means;

a step of generating data for authentication based on a synthesis of the variable user identification data and the fixed user identification data as extracted; and a step of outputting said data for authentication from said portable information processing device to said service furnishing device through said contact point A, wherein said data for authentication is used to determine a service to be furnished.

* * * * *